(12) United States Patent
Bader

(10) Patent No.: US 7,501,065 B1
(45) Date of Patent: *Mar. 10, 2009

(54) METHODS FOR TREATING AGRICULTURAL DRAINAGE WATER AND THE LIKE

(76) Inventor: Mansour S. Bader, P.O. Box 10675, College Station, TX (US) 77842-0675

( * ) Notice: Subject to any disclaimer, the term of this patent is extended or adjusted under 35 U.S.C. 154(b) by 486 days.

This patent is subject to a terminal disclaimer.

(21) Appl. No.: 11/430,235

(22) Filed: May 8, 2006

(51) Int. Cl.
*B01D 61/00* (2006.01)
*E21B 43/00* (2006.01)
*B01D 63/00* (2006.01)

(52) U.S. Cl. ............... 210/652; 210/650; 166/371; 166/279; 166/300; 166/309; 166/310

(58) Field of Classification Search .............. None
See application file for complete search history.

(56) References Cited

U.S. PATENT DOCUMENTS

| 4,327,146 | A | * | 4/1982 | White ................ 428/308.8 |
| 4,347,704 | A | * | 9/1982 | Marquardt et al. ........ 60/648 |
| 5,587,088 | A |   | 12/1996 | Bader |
| 6,365,051 | B1 | * | 4/2002 | Bader ................... 210/640 |
| 6,663,778 | B1 |   | 12/2003 | Bader |
| 7,093,663 | B1 | * | 8/2006 | Bader ................... 166/371 |

* cited by examiner

*Primary Examiner*—Krishnan S Menon

(57) ABSTRACT

Zero discharge processing methods for the treatment of agricultural drainage water (ADW) are disclosed. The disclosed methods are capable of meeting the three critical issues in treating ADW: (1) selective removal of sulfate scale-prone species and toxic species; (2) production of usable water that at least meets irrigation water quality; and (3) recovery of sodium sulfate and sodium chloride as valuable commodities.

14 Claims, 19 Drawing Sheets

METHODS FOR TREATING AGRICULTURAL DRAINAGE WATER AND THE LIKE

BACKGROUND OF THE INVENTION

In the San Joaquin Valley (Calif.), for instance, the estimated daily production of agricultural drainage water (ADW) is over 1.3 million m$^3$. ADW was considered waste that required disposal into solar ponds, the San Joaquin River, and the Pacific Ocean. The disposal rather than the reuse of ADW is still, however, the on-going practice in most areas of the San Joaquin Valley. Such a practice has led to costly environmental and ecological problems.

Until recently, the Integrated On-Farm Drainage Management (IFDM) system is experimented in some areas of the San Joaquin Valley. FIG. 1 shows the stages of the IFDM system. The IFDM system allows partial and sequential recycle of ADW to irrigate crops of progressively increasing salt tolerance. Farm operation is divided into three salinity areas: (1) the non-saline zone in which good quality irrigation water is used (e.g., for vegetables); (2) low-salinity zone in which recycled ADW from the non-saline zone is used (e.g., for cotton and grasses); and (3) moderate-salinity zone in which recycled ADW from the low-salinity zone is used (e.g., for various salt-tolerant trees, grasses, and halophytes). Once the progressively recycled ADW approaches intolerable salinity levels for the targeted crops, it will then be transferred via sumps into solar ponds or solar basins or water treatment facilities. In the short-term, the IFDM system partially manages ADW. However, the long-term effects on soil-groundwater (increase in salinity and toxicity), and humans-livestock (toxicity) could rise again as significant problems. In addition, the accumulation of untreated ADW in solar ponds and basins is still a problem.

Table 1 reveals salinity variations in ADW from farm operations that are no longer suitable for crops irrigation (Red Rock Ranch, Calif.). The salinity levels of the stored ADW range between about 11,000 mg/L and 300,000 mg/L. The bulk of salts are in the forms of sodium sulfate and sodium chloride. The bulk of scale species is in the form of calcium sulfate. Toxicity is largely manifested in the forms of selenium, and to a lesser extent in the forms of boron and transition metals (copper, iron, manganese, arsenic, and aluminum). The U.S. Environmental Protection Agency (EPA) ambient freshwater aquatic life continuous concentration criterion for selenium is 5 µg/L. Selenium concentrations in ADW are appreciably higher than 5 µg/L. Selenium at elevated concentrations behaves as a potent toxicant to waterfowl, plants, livestock, and humans.

The abundance of both solar radiation and ADW to absorb solar radiation may justify the generation of a large number of solar ponds and basins to store ADW. However, solar ponds and basins: (1) allow the gradual concentration rather than the immediate treatment of ADW to remove toxic species (e.g., selenium, metals, and boron) and recover salts (e.g., sodium sulfate and sodium chloride); and (2) waste the naturally evaporated ultra-pure water. Such solar evaporators serve as long-term salt-sinks for AWD that represent potential hazards to wildlife and groundwater quality.

Pressure-driven membrane systems such as Reverse Osmosis (RO) and Nanofiltration (NF) as well as conventional thermal-driven systems such as Multi-Effect Vapor Compression (MEVC) and others can be used to produce potable water from ADW. RO and NF systems are salinity-sensitive, and therefore, their power consumption is directly related to salinity. Since the selectivity of RO membranes is nearly ions-blind, the application of such membranes is generally limited to saline streams with osmotic pressures of about 500 psi. On the other hand, NF membranes are ions-selective that highly reject polyvalent anions and allow monovalent anions to pass through the membrane. NF membranes can thus be applied to saline streams with relatively high osmotic pressures, if the predominant salt in such streams is a monovalent (e.g., sodium chloride) rather than a polyvalent (e.g., sodium sulfate) salt. However, the predominant salt in ADW from the San Joaquin Valley is sodium sulfate. As such, the application of both RO and NF is almost equally limited to ADW streams with osmotic pressure of about 500 psi.

Thermal-driven desalination systems are generally salinity-insensitive, and thus, they are applicable to almost any saline stream. However, conventional thermal-driven systems are energy intensive, and their power consumption is not related to salinity. For instance, there are almost insignificant differences in power consumption between treating an ADW stream with 10,000 mg/L or a stream with 100,000 mg/L. Although the ruggedness of conventional thermal-driven desalination minimizes stages of pretreatment compared to the delicate RO and NF membranes, their capital cost is prohibitive. As such, they are economically unattractive to treat ADW.

If the average energy requirement to operate pressure-driven or thermal-driven desalination systems is assumed to be 10 kWhr/m$^3$ (about 50% lower in the case of well optimized RO, and about 50% higher in the case of well optimized MEVC), then the capacity of the required power plants to supply this energy to treat the daily generated ADW would be about 2,000 megawatts. In addition, ions paring of calcium-sulfate, strontium-sulfate as well as the existence of other scale-prone species in ADW could significantly impair the performance of such systems (higher operating cost). Further, neither pressure-driven (RO or NF) nor thermal-driven (MEVC) as a stand alone provides a zero or a near-zero discharge system, and thus the disposal of the concentrate stream is a critical issue.

Salt-gradient solar ponds (SGSP) are a cheap method for storing and using concentrated saline water to produce power (thermal and/or electrical). The functionality of SGSP is different from typical solar ponds. As shown in FIG. 2, the SGSP consists of three distinct layers: (1) surface zone (upper layer); (2) gradient zone (middle layer); and (3) heat-sink zone (lower layer). The lower zone contains a hyper-saline water (salinity exceeds 360,000 mg/L) that absorbs sunlight and serves as a heat sink. The temperature range of the lower zone is typically maintained between 340 and 370K to stabilize the gradient zone and prevent boiling. The middle zone contains water with variable salinity (approaches 100,000 mg/L) and serves as an insulating layer for the lower zone. The upper zone contains low salinity water (about 10,000 mg/L) or potable water that serves as a controlling parameter to efficiently operate the SGSP. The temperature of the upper zone is near or slightly below ambient temperature. Power can be produced by circulating hot hyper-saline water from the lower zone, for instance, to a Rankine cycle turbine to generate electricity or to a heat exchanger to provide thermal energy.

Apparently, the solution for ADW must be centered on two main issues. The first issue is to provide affordable energy resources to operate ADW treatment technologies. A manageable number of SGSP could serve the long-term energy requirements using the abundance of solar radiation combined with discarded ADW, or with makeup aqueous streams that contain the selectively recovered salts (e.g., sodium sulfate) from ADW.

The second issue is to immediately treat the generated ADW, rather than the on-going practice of "accumulate, contaminate, and then remediate" the aged and concentrated ADW. This would reduce the massive number of solar ponds and basins, minimize environmental impacts, and speed-up the recovery and production of salts. However, immediate treatment of ADW requires the use of economically-oriented, zero-discharge technologies that meet three critical objectives: (1) selective removal of sulfate scale and/or toxic species; (2) production of reusable water that at least meets agricultural water quality; and (3) segregation and extraction of worthy economic values from the bulk of separated salts (sodium sulfate and sodium chloride). This patent provides novel processing methods to achieve such objectives.

The innovative methods in this patent are divided into three main processing groups. The first group is based on the compressed-phase precipitation (CPP) process to treat ADW at all salinity levels. The second group is based on pressure-driven membranes (RO and NF) in conjunction with CPP to treat low salinity ADW. The third group is based on thermal-driven membranes (membrane distillation, MD) in conjunction with CPP to treat ADW at all salinity levels.

SUMMARY OF THE INVENTION

In one aspect, the present invention provides a method for producing sodium sulfate and sodium chloride from saline water. The inventive method comprising the steps of: (a) removing sulfate scale and impurities from saline water to produce intermediate saline water; (b) removing sodium sulfate from intermediate saline water to produce sodium chloride rich water; (c) recycling sodium chloride rich water through the processing steps of the method to depress the solubility limits of sodium sulfate; or (d) using sodium chloride rich water to irrigate salt tolerant crops; or (e) blending sodium chloride rich water with irrigation water to irrigate low salt tolerant crops; or (f) using sodium chloride rich water to construct salt-gradient solar ponds to produce energy; or (g) concentrating sodium chloride rich water in solar stills to produce sodium chloride. Removing sulfate scale and impurities from saline water in step (a) by (i) injecting saline water into a first precipitator at a pressure between 200 psi and 1,000 psi through at least one nozzle to produce a jet stream from saline water; (ii) injecting amine solvent or amine solvent with modifier into the first precipitator at a pressure between 200 psi and the critical pressure of amine solvent or amine solvent with modifier through at least one nozzle to form precipitates comprising sulfate scale and impurities from saline water; (iii) filtering saline water to remove precipitates in the under-flow of a first filter and to produce intermediate saline water in the over-flow of the first filter; and (iv) removing at least most of amine solvent or amine solvent with modifier from the under-flow of the first filter by a first stripping unit. Removing sodium sulfate from intermediate saline water in step (b) by (i) injecting intermediate saline water into a second precipitator at a pressure between 200 psi and 1,000 psi through at least one nozzle to produce a jet stream of intermediate saline water; (ii) injecting amine solvent or amine solvent with modifier into the second precipitator at a pressure between 200 psi and the critical pressure of amine solvent or amine solvent with modifier through at least one nozzle to form precipitates comprising sodium sulfate from intermediate saline water; (iii) filtering intermediate saline water to remove precipitates in the under-flow of a second filter and to produce sodium chloride rich water in the over-flow of the second filter; (iv) removing at least most of amine solvent or amine solvent with modifier from the under-flow of the second filter by a second stripping unit; and (v) removing at least most of amine solvent or amine solvent with modifier from the over-flow of the second filter by a third stripping unit.

Saline water is agricultural drainage water, natural brine, pulp and paper processed water, textile processed water, water of hydration from melted Glauber's salts, blow-down water from conventional thermal driven desalination systems, oil-gas fields produced water, coal-bed produced water, mining operations produced water, flue gas desulphurization produced water, or a combination thereof. Sulfate scale is calcium sulfate, strontium sulfate, barium sulfate, or a combination thereof. Impurities are selenium, boron, copper, iron, manganese, arsenic, aluminum, cobalt, nickel, zinc, magnesium, or a combination thereof. The injection jet nozzle is coaxial nozzle, spray nozzle, vibrating nozzle, premixed nozzle, or a combination thereof. The amine solvent is selected from the group consisting of isopropylamine, propylamine, dipropylamine, diisopropylamine, ethylamine, diethylamine, methylamine, dimethylamine, or a combination thereof. The modifier for an amine solvent is nitrogen, nitrous oxide, or a combination thereof. The produced sodium sulfate is in the form anhydrous or decahydrate or a combination thereof.

In another aspect, the present invention provides a method for producing sodium sulfate and sodium chloride from saline water. The inventive method comprises the steps of: (a) removing sulfate from saline water by nanofiltration to produce sulfate rich concentrate and sodium chloride rich water; (b) removing sulfate scale and impurities from sulfate rich concentrate to produce sodium sulfate rich water; (c) removing sodium sulfate from sodium sulfate rich water; (d) recycling sodium chloride rich water through the processing steps of the method to depress the solubility limits of sodium sulfate; or (e) using sodium chloride rich water to irrigate salt tolerant crops; or (f) blending sodium chloride rich water with irrigation water to irrigate low salt tolerant crops; or (g) using sodium chloride rich water to construct salt-gradient solar ponds to produce energy; or (h) concentrating sodium chloride rich water in solar stills to produce sodium chloride. Removing sulfate scale and impurities from sulfate rich concentrate in step (b) by (i) injecting sulfate rich concentrate into a first precipitator at a pressure between 200 psi and 1,000 psi through at least one nozzle to produce a jet stream from sulfate rich concentrate; (ii) injecting amine solvent or amine solvent with modifier into first precipitator at a pressure between 200 psi and the critical pressure of amine solvent or amine solvent with modifier through at least one nozzle to form precipitates comprising sulfate scale and impurities from sulfate rich concentrate; (iii) filtering sulfate rich concentrate to remove precipitates in the under-flow of a first filter and to produce sodium sulfate rich water in the over-flow of the first filter; and (iv) removing at least most of amine solvent or amine solvent with modifier from the under-flow of the first filter by a first stripping unit. Removing sodium sulfate from sodium sulfate rich water in step (c) by (i) injecting sodium sulfate rich water into a second precipitator at a pressure between 200 psi and 1,000 psi through at least one nozzle to produce a jet stream of sodium sulfate rich water; (ii) injecting amine solvent or amine solvent with modifier into second precipitator at a pressure between 200 psi and the critical pressure of amine solvent or amine solvent with modifier through at least one nozzle to form precipitates comprising sodium sulfate from sodium sulfate rich water; (iii) filtering sodium sulfate rich water to remove precipitates in the under-flow of a second filter and to produce intermediate sodium sulfate rich water in the over-flow of the second filter;

(iv) removing at least most of amine solvent or amine solvent with modifier from the under-flow of the second filter by a second stripping unit; (v) removing at least most of amine solvent or amine solvent with modifier from the over-flow of the second filter by a third stripping unit; and (vi) recycling intermediate sodium sulfate rich water through the processing steps of the method.

In another aspect, the present invention provides a method for producing sodium sulfate and sodium chloride from saline water. The inventive method comprises the steps of: (a) removing sulfate scale and impurities from saline water to produce intermediate saline water; (b) removing sulfate from intermediate saline water by nanofiltration to produce sodium sulfate rich concentrate and sodium chloride rich water; (c) removing sodium sulfate from sodium sulfate rich concentrate; (d) recycling sodium chloride rich water through the processing steps of the method to depress the solubility limits of sodium sulfate; or (e) using sodium chloride rich water to irrigate salt tolerant crops; or (f) blending sodium chloride rich water with irrigation water to irrigate low salt tolerant crops; or (g) using sodium chloride rich water to construct salt-gradient solar ponds to produce energy; or (h) concentrating sodium chloride rich water in solar stills to produce sodium chloride. Removing sulfate scale and impurities from saline water in step (a) by (i) injecting saline water into a first precipitator at a pressure between 200 psi and 1,000 psi through at least one nozzle to produce a jet stream from saline water; (ii) injecting amine solvent or amine solvent with modifier into the first precipitator at a pressure between 200 psi and the critical pressure of amine solvent or amine solvent with modifier through at least one nozzle to form precipitates comprising sulfate scale and impurities from saline water; (iii) filtering saline water to remove precipitates in the under-flow of a first filter and to produce intermediate saline water in the over-flow of the first filter; (iv) removing at least most of amine solvent or amine solvent with modifier from the under-flow of the first filter by a first stripping unit; and (v) removing at least most of amine solvent or amine solvent with modifier from the over-flow of the first filter by a second stripping unit. Removing sodium sulfate from sodium sulfate rich concentrate in step (c) by (i) injecting sodium sulfate rich concentrate into a second precipitator at a pressure between 200 psi and 1,000 psi through at least one nozzle to produce a jet stream of sodium sulfate rich concentrate; (ii) injecting amine solvent or amine solvent with modifier into the second precipitator at a pressure between 200 psi and the critical pressure of amine solvent or amine solvent with modifier through at least one nozzle to form precipitates comprising sodium sulfate from sodium sulfate rich concentrate; (iii) filtering sodium sulfate rich concentrate to remove precipitates in the under-flow of a second filter and to produce intermediate sodium sulfate rich water in the over-flow of the second filter; (iv) removing at least most of amine solvent or amine solvent with modifier from the under-flow of the second filter by a third stripping unit; (v) removing at least most of amine solvent or amine solvent with modifier from the over-flow of the second filter by a fourth stripping unit; and (vi) recycling intermediate sodium sulfate rich water through the processing steps of the method;

In another aspect, the present invention provides a method for producing sodium sulfate, sodium chloride, and potable water from saline water. The inventive method comprises the steps of: (a) producing potable water and concentrate from saline water by reverse osmosis or membrane distillation; (b) removing sulfate scale and impurities from concentrate to produce intermediate concentrate; (c) removing sodium sulfate from intermediate concentrate to produce sodium chloride rich water; (d) recycling sodium chloride rich water through the processing steps of the method to depress the solubility limits of sodium sulfate; or (e) using sodium chloride rich water to irrigate salt tolerant crops; or (f) blending sodium chloride rich water with irrigation water to irrigate low salt tolerant crops; or (g) using sodium chloride rich water to construct salt-gradient solar ponds to produce energy; or (h) concentrating sodium chloride rich water in solar stills to produce sodium chloride. Removing sulfate scale and impurities from concentrate in step (b) by (i) injecting concentrate into a first precipitator at a pressure between 200 psi and 1,000 psi through at least one nozzle to produce a jet stream from concentrate; (ii) injecting amine solvent or amine solvent with modifier into the first precipitator at a pressure between 200 psi and the critical pressure of amine solvent or amine solvent with modifier through at least one nozzle to form precipitates comprising sulfate scale and impurities from concentrate; (iii) filtering concentrate to remove precipitates in the under-flow of a first filter and to produce intermediate concentrate in the over-flow of the first filter; and (iv) removing at least most of amine solvent or amine solvent with modifier from the under-flow of the first filter by a first stripping unit. Removing sodium sulfate from intermediate concentrate in step (c) by (i) injecting intermediate concentrate into a second precipitator at a pressure between 200 psi and 1,000 psi through at least one nozzle to produce a jet stream of intermediate concentrate; (ii) injecting amine solvent or amine solvent with modifier into the second precipitator at a pressure between 200 psi and the critical pressure of amine solvent or amine solvent with modifier through at least one nozzle to form precipitates comprising sodium sulfate from intermediate concentrate; (iii) filtering intermediate concentrate to remove precipitates in the under-flow of a second filter and to produce sodium chloride rich water in the over-flow of the second filter; (iv) removing at least most of amine solvent or amine solvent with modifier from the under-flow of the second filter by a second stripping unit; and (v) removing at least most of amine solvent or amine solvent with modifier from the over-flow of the second filter by a third stripping unit.

In yet another aspect, the present invention provides a method for producing sodium sulfate, sodium chloride, and potable water from saline water. The inventive method comprises the steps of: (a) removing sulfate scale and impurities from saline water to produce intermediate saline water; (b) producing potable water and concentrate from intermediate saline water by reverse osmosis or membrane distillation; (c) removing sodium sulfate from concentrate to produce sodium chloride rich water; (d) recycling sodium chloride rich water through the processing steps of the method to depress the solubility limits of sodium sulfate; or (e) using sodium chloride rich water to irrigate salt tolerant crops; or (f) blending sodium chloride rich water with irrigation water to irrigate low salt tolerant crops; or (g) using sodium chloride rich water to construct salt-gradient solar ponds to produce energy; or (h) concentrating sodium chloride rich water in solar stills to produce sodium chloride. Removing sulfate scale and impurities from saline water in step (a) by: (i) injecting saline water into a first precipitator at a pressure between 200 psi and 1,000 psi through at least one nozzle to produce a jet stream from saline water; (ii) injecting amine solvent or amine solvent with modifier into the first precipitator at a pressure between 200 psi and the critical pressure of amine solvent or amine solvent with modifier through at least one nozzle to form precipitates comprising sulfate scale and impurities from saline water; (iii) filtering saline water to remove precipitates in the under-flow of a first filter and to produce intermediate saline water in the over-flow of the first filter; (iv) removing at least most of amine solvent or amine solvent with modifier from the under-flow of the first filter by a first stripping unit; and (v) removing at least most of amine solvent or amine solvent with modifier from the over-flow of the first filter by a second stripping unit. Removing sodium sulfate from concentrate in step (c) by (i) injecting concentrate into a second precipitator at a pressure between 200 psi and 1,000 psi through at least one nozzle to produce a jet stream of concentrate; (ii) injecting amine solvent or amine solvent with modifier into the second precipitator at a pressure between 200 psi and the critical pressure of amine solvent or amine solvent with modifier through at least one nozzle to form precipitates comprising sodium sulfate from concentrate; (iii) filtering concentrate to remove precipitates in the under-flow of a second filter and to produce sodium chloride rich water in the over-flow of the second filter; (iv) removing at least most of amine solvent or amine solvent with modifier from the under-flow of the second filter by a third stripping unit; and (v) removing at least most of amine solvent or amine solvent with modifier from the over-flow of the second filter by a fourth stripping unit.

This invention is of particular interest in connection with industries such as, but not limited to, water reclamation for agricultural purposes, pulp and paper, textile, salts production from natural brine, salts production from melting naturally occurring deposit of Glauber's salts, production of road de-icing salts, mining, metals refinery, geothermal power plants, oil and gas, flue gas desulphurization, fertilizer production, gypsum production, coal or oil fired power plants, industrial boilers, cooling towers, saline water desalination plants, treatment of contaminated water sources such as surface or ground water by agricultural drainage water or natural brine or oil-gas fields brine or brine resulting from all kinds of mining operations, treatment of agricultural drainage water or natural brine or oil-gas fields brine or brine resulting from all kinds of mining operations to prevent contaminating water sources such as surface or ground water, and other similar operations.

This invention is not restricted to use in connection with one particular application. This invention can be used, in general, for the selective removal of inorganic from aqueous streams with precipitates ranging from coarse to submicron sizes. Further objects, novel features, and advantages of the present invention will be apparent to those skilled in the art upon examining the accompanying drawings and upon reading the following description of the preferred embodiments, or may be learned by practice of the invention.

DESCRIPTION OF THE PREFERRED EMBODIMENT

I have previously invented a liquid-phase precipitation (LPP) method for the separation of inorganic species from aqueous streams. The effect of the separation in the LPP process is to mix the aqueous solution with a suitable solvent at ambient temperature and atmospheric pressure to form selective precipitates. The suitable solvents are those which have the capability to meet two basic criteria.

The first criteria is the suitability to precipitate targeted inorganic species from aqueous solutions. The selected organic solvent must be miscible with the aqueous phase. Of equal importance, the targeted inorganic species must be sparingly soluble in the organic solvent. The addition of such a solvent to an inorganic-aqueous solution leads to the capture of part of the water molecules and reduces the solubility of inorganic species in water which form insoluble precipitates. The solubility of the targeted inorganic species in the organic solvent is a critical factor in achieving the degree of saturation. Therefore, solubility related factors such as the ionic charge, ionic radius, and the presence of a suitable anion in an inorganic-aqueous solution and its effect on the pH rate of change play an important role in affecting and characterizing the formation of precipitates.

The second criteria is suitability for overall process design. For ease of recovery, the selected organic solvent must have favorable physical properties such as a low boiling point, high vapor pressure, high relative volatility, and no azeotrope formation with water. From a process design standpoint, the selected solvent must have low toxicity since traces of the organic solvent always remain in the discharge stream. The solvent vapors are also of prime health and environmental concerns. Further, the selected solvent must be chemically stable, compatible with the process, and relatively inexpensive.

Several solvents have been identified for potential use in LPP. These solvents are isopropylamine (IPA), ethylamine (EA), propylamine (PA), dipropylamine (DPA), diisopropylamine (DIPA), diethylamine (DEA), and dimethylamine (DMA). However, IPA is the preferred solvent in the LPP process. The preference of IPA is attributed to its high precipitation ability with different basic salts, favorable properties (boiling point: 305.5 K; vapor pressure: 478 mmHg at 293.2 K); and minimal environmental risks.

Figure 3:
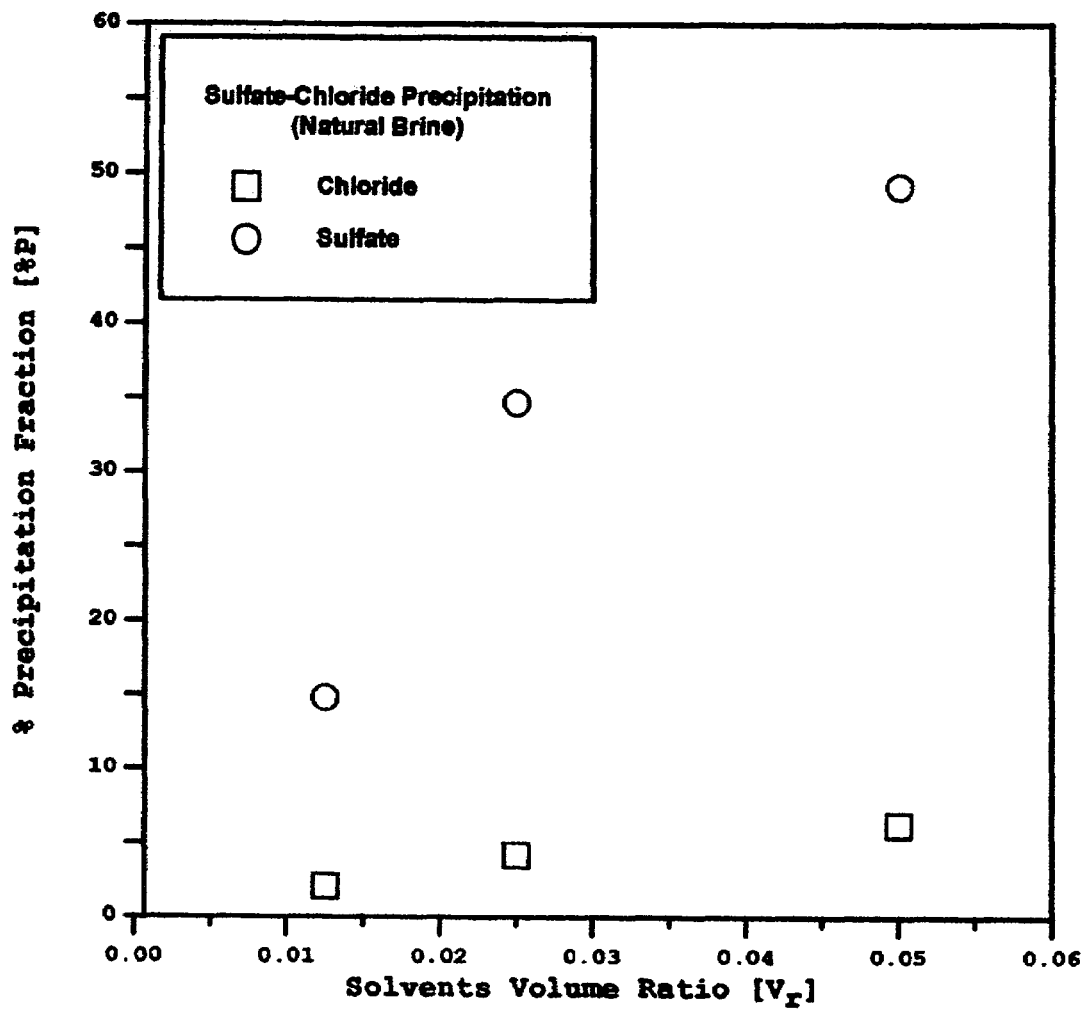
FIG. 3 illustrates the precipitation of sulfate and chloride ions from natural brine.

LPP can be evaluated in terms of the precipitation fractions (P) as a function of the solvents volume ratio (Vr) that is the ratio of the amine solvent volume to the aqueous volume. LPP is tested with sodium chloride rich natural brine that contains significant amounts of sodium sulfate. Table 2 presents ions concentrations in the tested brine. FIG. 3 shows the precipitation fractions for sulfate and chloride ions in a single LPP stage from the natural brine. LPP is capable of removing about 50% of sulfate in a single stage using a relatively small amount (a Vr value of 0.05) of the nearly completely recoverable IPA as a precipitation solvent.

However, there is always an interest to improve the performance of LPP. Improvements in LPP can be seen in two areas. The first improvement is to reach saturation faster, particularly for inorganic species with an intermediate to high aqueous solubility limits (e.g., sodium sulfate). This would minimize the use of the amine solvent, and reduce the size of processing equipment. The second improvement is to produce controllable precipitates that are more uniformly distributed with high yield. This inventive compressed-phase precipitation (CPP) process has the potential to achieve such improvements.

In concept, CPP is similar to LPP. That is the targeted inorganic species must be nearly insoluble in the amine solvent, whereas the mother solvent (water), in which the inorganic species is dissolved, is miscible with the amine solvent. However, the difference is that the amine solvent in CPP is subject to pressure and/or temperature manipulations, and thus the amine solvent exhibits unusual thermophysical properties such as liquid-like density, higher diffusivity, higher compressibility, and lower viscosity.

The fast diffusion combined with low viscosity of the compressed amine solvent into the inorganic-aqueous phase produces faster supersaturation of the targeted inorganic species and its possible precipitation in the desired size. Thus, the particle-size as well as the particle-size distribution, morphology, and crystal structure can be controlled. The achievement of a faster supersaturation degree would, in turn, minimize the use of the amine solvent, maximize the recovery of the amine solvent, and maximize the removal of the targeted inorganic species.

However, several interacted factors could influence the performance of the CPP process. These factors are: (1) the identity and initial concentration of the targeted inorganic species in the saline stream; (2) the injection methods of both the saline stream and the amine solvent into the precipitator unit; and (3) the pressures and temperatures of both the saline stream and the amine solvent. Following is a discussion of these factors.

Targeted Inorganic Species

As shown in Table 1, the three main minerals in ADW are sodium sulfate, sodium chloride, and calcium sulfate. Table 1 reveals that the reported ADW contain 60-90% of sodium sulfate, and 10-33% of sodium chloride. The contents of these two predominant minerals in ADW are between 80 and 97% of the total species. The interaction among sodium sulfate, calcium sulfate, and sodium chloride is of prime interest.

Figure 4:
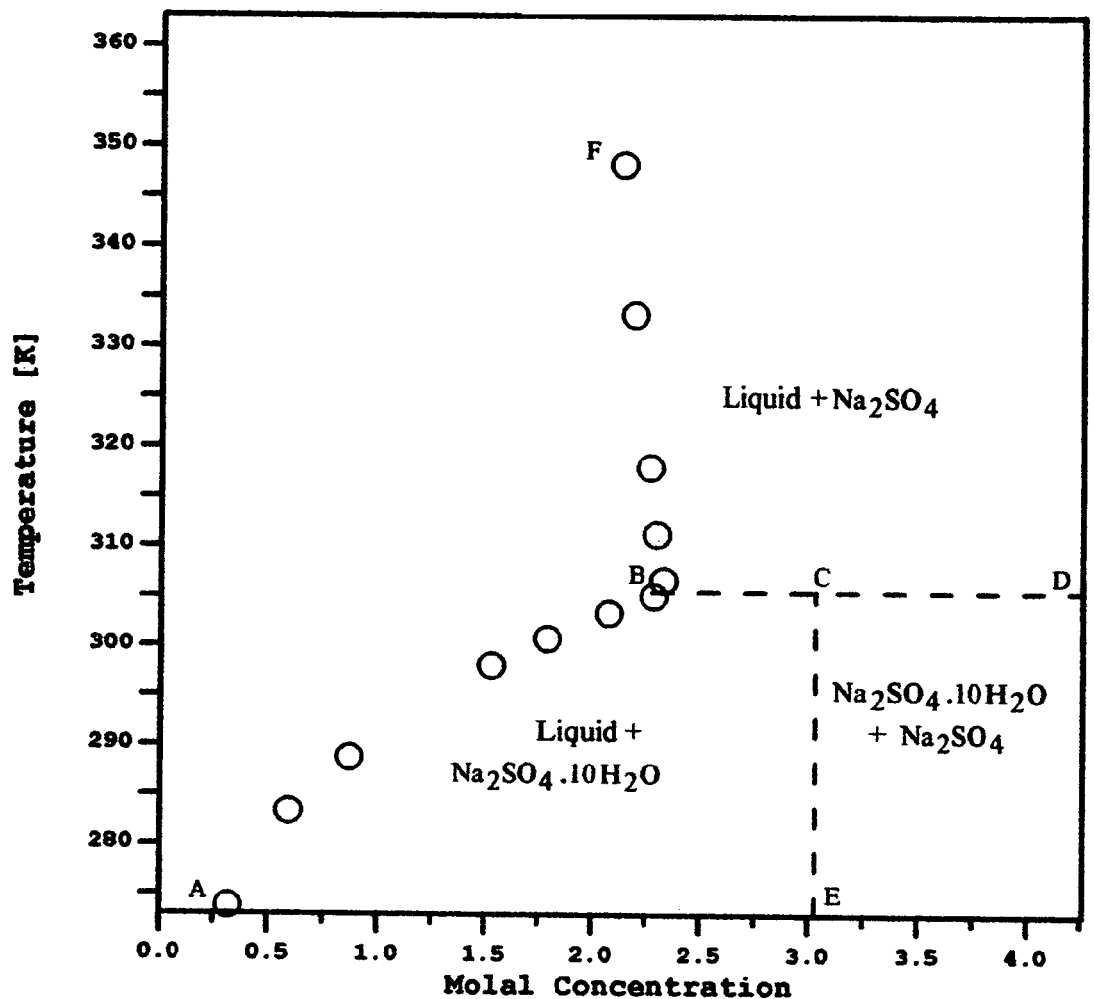
FIG. 4 illustrates the aqueous solubility phase diagram of sodium sulfate.

Sodium sulfate occurs as two phases: (1) mirabalite or sodium sulfate decahydrate ($Na_2SO_4 \cdot 10H_2O$); and (2) thenardite or sodium sulfate anhydrous ($Na_2SO_4$). FIG. 4 illustrates the aqueous solubility phase diagram (temperatures vs. concentrations) of sodium sulfate at atmospheric pressure. Along the solubility curve AB, sodium sulfate is precipitated as a mirabalite with a transition temperature at about 305.5 K. The aqueous solubility limits of mirabalite decrease with decreasing temperatures. Below the transition temperature and along the line CE, precipitates of mirabalite decompose to form precipitates of both mirabalite and thenardite (forming two solid phases and one liquid phase). Along the solubility line BF, however, sodium sulfate is precipitated as pure thenardite. The aqueous solubility limits of thenardite decrease with increasing temperatures. Thenardite is more desirable (no water impurity and higher sale value) than mirabalite.

Figure 5:
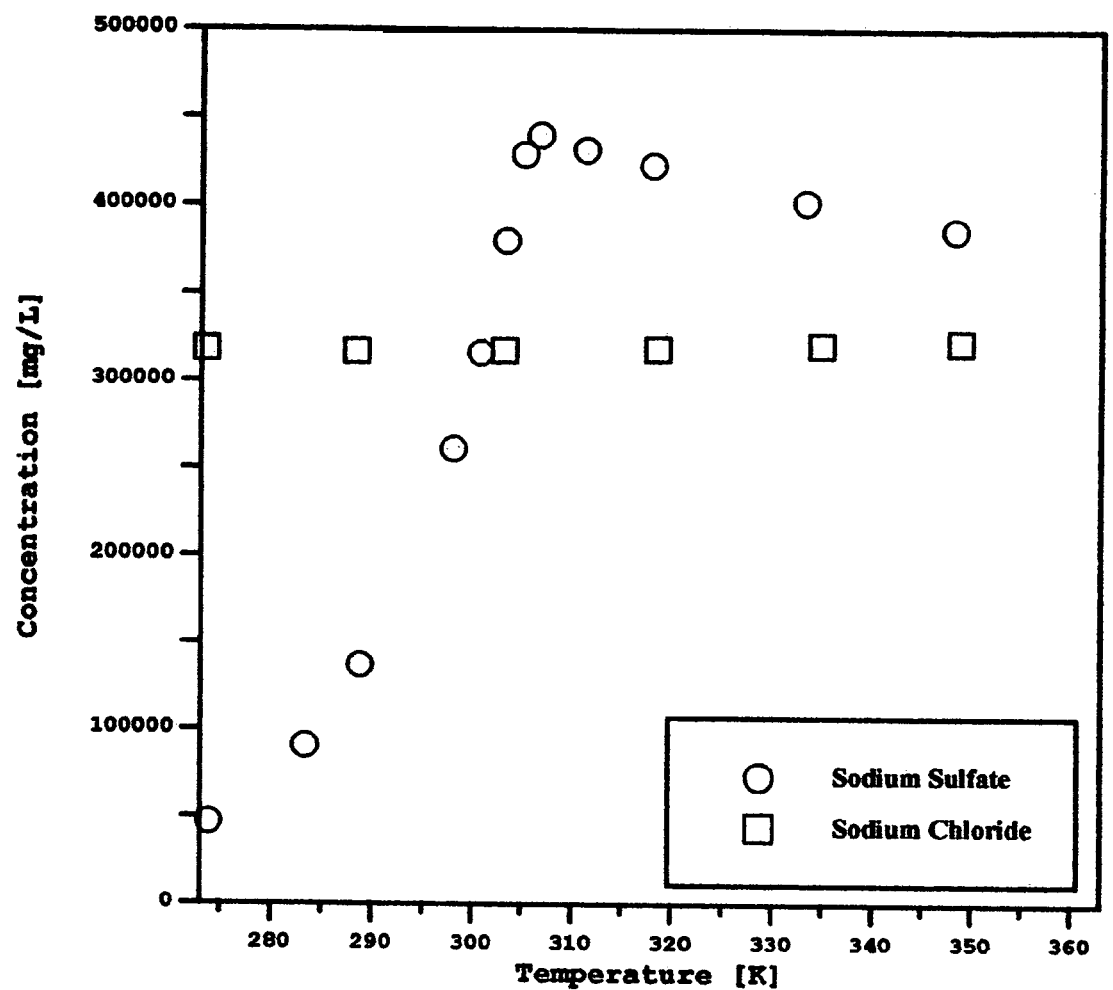
FIG. 5 illustrates the individual aqueous solubility limits of sodium sulfate and sodium chloride.

FIG. 5 shows the individual aqueous solubility limits of sodium sulfate and sodium chloride as a function of temperatures at atmospheric pressure. The solubility limits of sodium chloride are almost flat (slightly increase with increasing temperatures). The separation of sodium sulfate from sodium chloride can be achieved by: (1) changing temperatures (cooling in the case of precipitating mirabalite and heating in the case of precipitating thenardite); or (2) adding another component (e.g., LPP or CPP) to force out sodium sulfate from the liquid phase; or (3) using selective membranes for polyvalent anions (e.g., NF).

Figure 6:
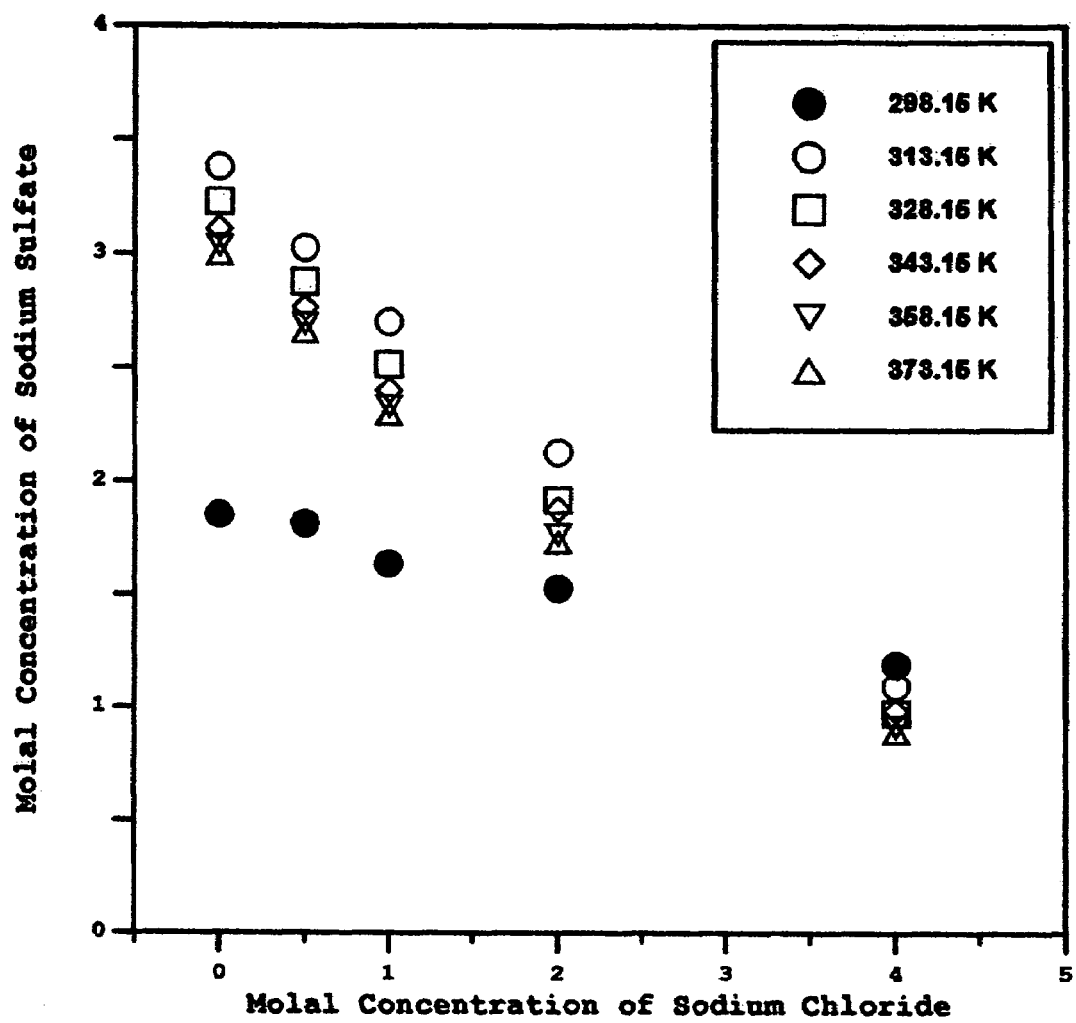
FIG. 6 illustrates the solubility limits of sodium sulfate versus sodium chloride concentrations at different temperatures.

The solubility limits of sodium sulfate in ADW are mainly affected by the presence of sodium chloride and temperature. However, the effects of pressure (much lower than the critical pressure of water) and the presence of calcium sulfate (much lower solubility limits than sodium sulfate) are not appreciable. FIG. 6 shows the solubility limits of sodium sulfate as a function of sodium chloride concentrations at different temperatures. The solubility limits of sodium sulfate decrease with increasing temperatures and sodium chloride concentrations. The higher the concentration of sodium chloride, the larger the depression in the solubility limits of sodium sulfate (due to the common ion effect, sodium). FIG. 6 also indicates that the transition temperature from mirabalite to thenardite is lowered from 305.5 K to 298.2 K at a high concentration of sodium chloride (e.g., 4 molal).

Calcium sulfate is the third largest mineral in ADW. It has three principle forms: calcium sulfate dihydrate or gypsum ($CaSO_4 \cdot 2H_2O$), calcium sulfate hemihydrate ($CaSO_4 \cdot \frac{1}{2}H_2O$), and calcium sulfate anhydrite ($CaSO_4$). Gypsum forms at low temperatures (below 358.2 K) whereas hemihydrate and anhydrite form at high temperatures (above 373.2K). The gypsum-anhydrite transition temperature is about 333.2 K. Gypsum would thus be the main occurring calcium sulfate mineral within ADW.

Figure 7:
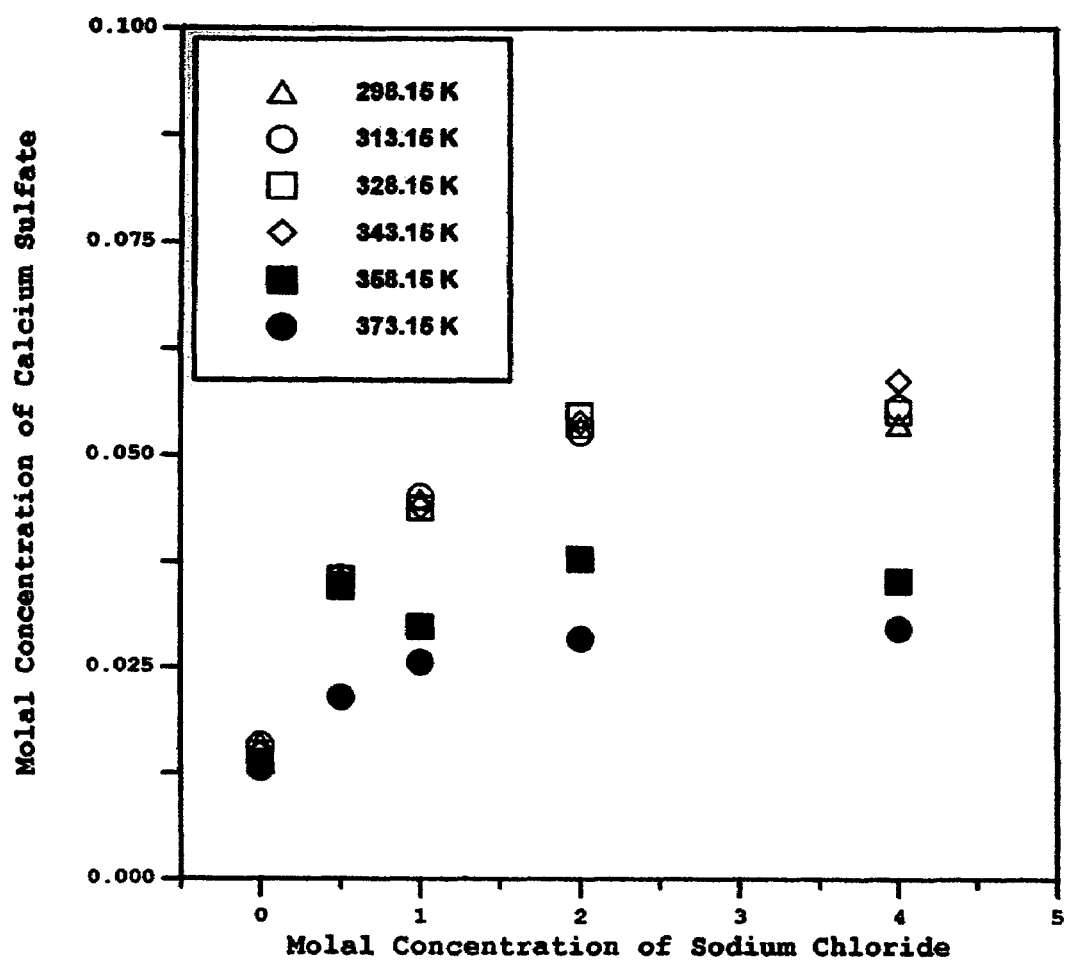
FIG. 7 illustrates the solubility limits of calcium sulfate versus sodium chloride concentrations at different temperatures.

The solubility limits of calcium sulfate are affected by the significant presence of both sodium sulfate and sodium chloride, as well as the change in temperatures. FIG. 7 shows the solubility limits of calcium sulfate versus sodium chloride concentrations and temperatures. In general, the solubility limits of calcium sulfate increase with increasing sodium chloride concentrations to a maximum (between 2 and 4 molal of sodium chloride) and then decrease. Below 358.2 K, calcium sulfate is in the form of gypsum. At 358.2 K, however, gypsum is appreciably transmitted to anhydrite (FIG. 7). Calcium sulfate at 373.2 K is purely in the form of anhydrite. Apparently, the solubility limits of gypsum in the presence of sodium chloride insignificantly vary with temperatures (e.g., between 298.2 and 343.2K).

Figure 8:
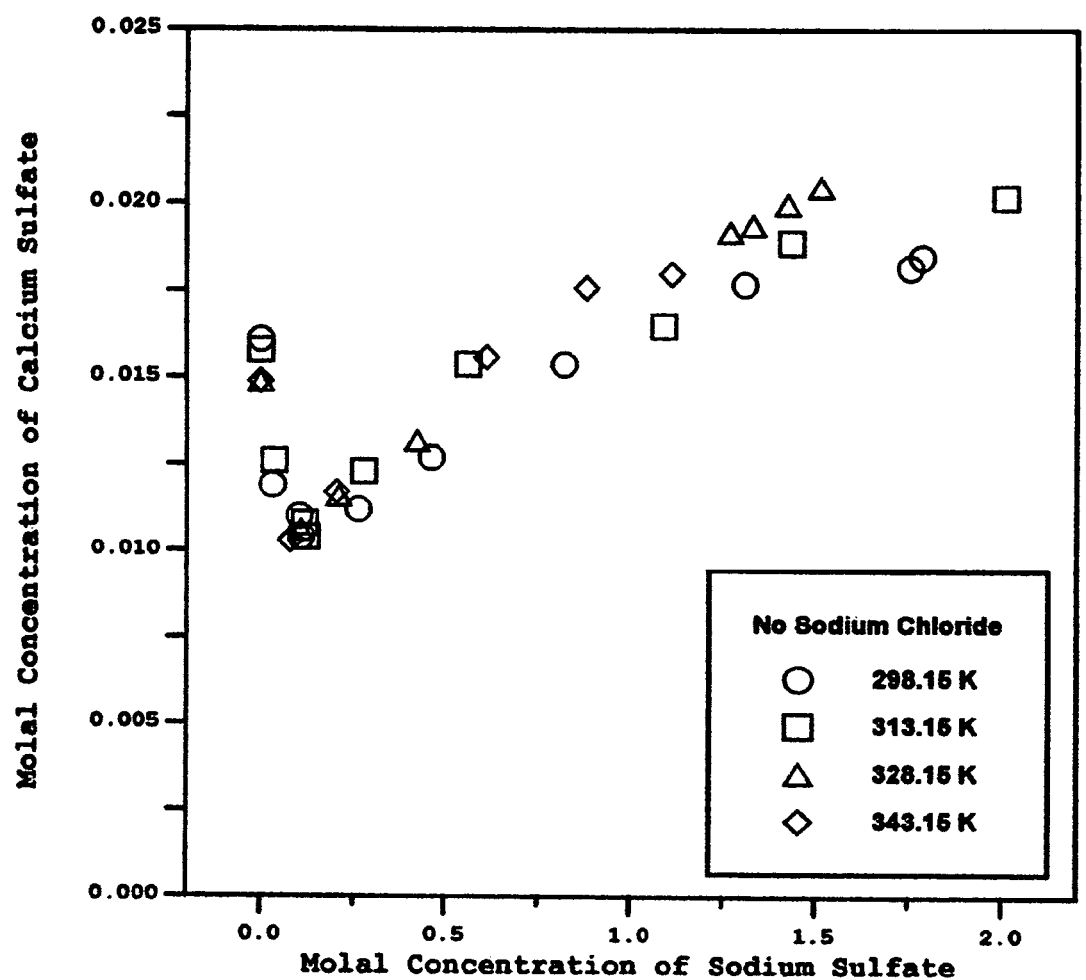
FIG. 8 illustrates the solubility limits of gypsum versus sodium sulfate concentrations at different temperatures.

FIG. 8 shows the solubility limits of gypsum as a function of sodium sulfate concentrations and temperatures. Such limits first decrease and then increase with increasing sodium sulfate concentrations. The decrease in the solubility limits of gypsum occur within about 0.5 molal of sodium sulfate due to the common ion effect (sulfate). This effect is opposed by the salting-in effect due to the uncommon ion (sodium) at higher concentrations of sodium sulfate. The variations in the solubility limits of gypsum with temperatures are almost insignificant.

Figure 9:
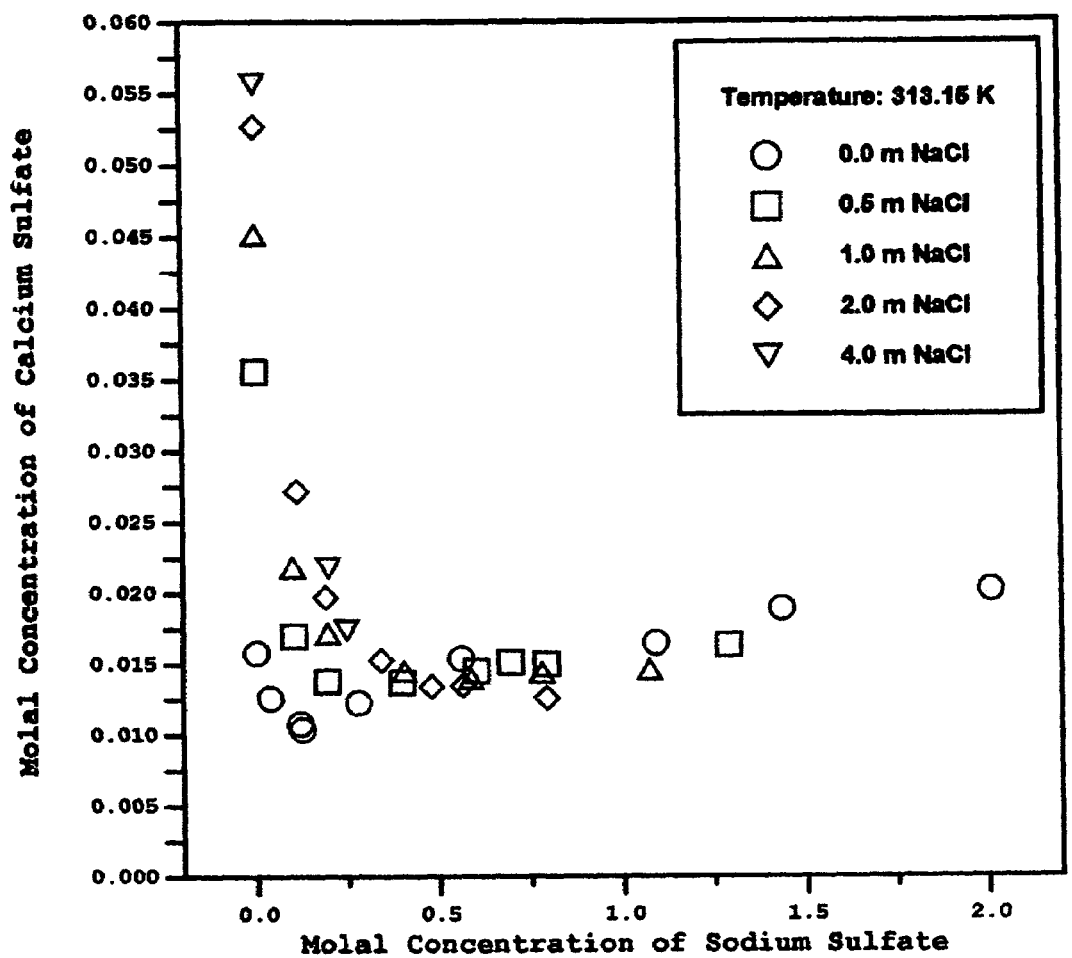
FIG. 9 illustrates the solubility limits of gypsum versus concentrations of both sodium sulfate and sodium chloride at 313.15K.

FIG. 9 shows the solubility limits of gypsum at 313.2 K versus both sodium sulfate and sodium chloride concentrations. The same trend (a decrease and then an increase) in the solubility limits of gypsum that is observed in the presence of only sodium sulfate is also observed in the presence of both sodium chloride and sodium sulfate. However, the appreciable existence of sodium chloride increases the solubility limits of gypsum, particularly at low concentrations of sodium sulfate (below 0.5 molal).

For low salinity ADW (e.g., Table 1: Sump and Solar Evaporator 1) in which the concentrations of sodium chloride (about or less than 0.1 molal) and sodium sulfate (about or less than 0.2 molal) are relatively small, the solubility limits of gypsum (FIG. 7) are depressed due to the effect of sulfate as the common ion. For high salinity ADW (e.g., Table 1: Solar Evaporators 2 and 3) in which the concentrations of both sodium sulfate and sodium chloride are appreciable, the solubility limits of gypsum are enhanced (FIG. 9) due mainly to the dissolving capacity of sodium chloride.

In addition to gypsum, other minor sulfate scale species such as strontium sulfate (celestite) and barium sulfate (barite) are also critical. The solubility limits of celestite (about an order of magnitude lower than the aqueous solubility limits of gypsum) and barite (about one and one-half orders of magnitude lower than the solubility limits of celestite) are extremely low. The early precipitation of celestite and barite would act as a seeding agent in initiating and speeding gypsum precipitation.

Impurities such as selenium, transition metals, boron, and magnesium hydroxide (brucite) in ADW must be removed to recover acceptable quality of sodium sulfate. Selenium (Se) is mainly concentrated in ADW as selenate ($SeO_4^{-2}$). Small amounts (0-5%) of selenium could also present as a monovalent ($HSeO_3^-$) and/or as a divalent ($SeO_3^{-2}$) selenite. However, the monovalent selenite presents at low pH values (below 6). As shown in Table 1, the normal pH values for ADW is between 7.2 and 8.5, which indicate the existence of the divalent rather than the monovalent selenite. Selenate and divalent selenite can effectively be co-precipitated with sulfate scale species (gypsum, celestite, and barite) by LPP or CPP.

The trace amounts of transition metals can also be co-precipitated as amorphous oxides by LPP or CPP. For concentrated (high salinity) ADW, the concentration of boron and magnesium is somewhat significant. Both boron and magnesium can be precipitated by LPP or CPP in the forms of hydroxide. The presence of an excess of the hydroxide ion from using an amine solvent as a precipitation agent or from the significant presence of sulfate (the excess of sulfate reacts with water to generate hydroxide ion) would increase the pH values. However, the selected amine solvents for LPP or CPP are weak bases, which do not furnish the hydroxide ion directly by dissociation. In addition, the volume of a selected amine solvent in the CPP is expected to be low compared to the volume of the ADW stream to be treated. Thus, the pH of the mixed stream (the amine solvent and the ADW stream) is the key to allow significant or insignificant precipitation of boron and magnesium in the forms of hydroxide.

Injection Methods

Various commercial jet injection devices such as coaxial injection nozzles, spray injection nozzles, vibrating injection orifices or nozzles, premixed injection nozzles, and others can be used in applying the CPP process. Although the effectiveness of the CPP process lies mainly in the ability of the amine solvents as a function of manipulating pressure, temperature, and other operating variables, the efficiency of the injection device (contact between the amine solvent and saline water) is also important. If the nucleation (precipitate formation) and condensation (precipitate growth) mechanisms are fast enough, then precipitates will reach a high degree of supersaturation in a very short period of time and within the precipitator unit. This would allow appreciable reduction in the size of the precipitator unit. A significantly high degree of supersaturation, however, leads to smaller precipitates.

A possible jet injection method that can be used in the CPP process is a concentric nozzle. In such a nozzle, the ADW stream flows through the inner tube while the amine solvent flows through the coaxial annulus. Therefore, the main mechanism of the jet hydrodynamic mixing is that the jet stream (ADW) draws in compressed amine fluid from the surrounding mass of such a fluid. The smaller the nozzle diameters, the higher the inlet velocities of the compressed fluids, which will result in a more efficient micromixing. The highest nucleation of precipitates will take place at the border of the jet stream (region of contact). However, the highest condensation of precipitates will take place at the center of the jet stream due to the high turbulence impact and higher solute concentration in the center of the jet.

Another possible injection method that can be applied in the CPP process is that the compressed amine and the ADW stream are injected into the precipitator unit via two separate spray nozzles. If the velocities of the injected fluids are not equal, then fast and/or a significantly high degree of supersaturation may not be achieved. Therefore, the induction and condensation periods for precipitates will be longer. This could affect the design of the precipitator unit (the need for a larger instead of a smaller precipitator unit, further mixing devices such as a stirred precipitator unit, precipitates seeding step, etc.). However, a moderate degree of supersaturation leads to larger precipitates.

Effects of Pressure and Temperature

Table 3 reveals that the selected amine solvents have relatively low critical pressures, and moderate critical temperatures. As the carbon number of the selected amine solvents increases, critical pressures decrease while critical temperatures (as well as boiling temperatures) increase. One of the economical approaches is to conduct the CPP process within the critical pressure of the selected amine solvent. The critical pressures of the selected amine solvents vary between about 440 psi (DPA) and 1,090 psi (MA).

The critical temperatures of the selected amine solvents lie within the desired intermediate thermal region (400-600 K), a thermal region that permits the stabilization of the kinetic phase rather than the thermodynamic phase. In applications such as the synthesis of inorganic precipitates (e.g., thin-porous and thin-dense ceramic membranes for gas or liquid streams, high-temperature superconductors (HTS), solid acids fuel cells, thin-film solar cells, new compounds, pharmaceutical products, etc.), this advantage combined with the very low viscosities of compressed amine solvents could make such solvents highly suitable media for precipitating inorganic species in sub-micron sizes.

In order to precipitate sodium sulfate in the desired anhydrous form, the CPP must be conducted at 313K or higher. In addition, temperatures of ADW from solar ponds (not sumps) are typically above ambient (310-350K). The compressed amine solvent in the CPP can be used at a subcritical temperature, or it can be matched with an appropriate modifier to achieve mainly a lower critical temperature while maintaining the polarity, basicity, miscibility, and precipitating ability of the compressed amine in inorganic-aqueous streams.

Molecules containing a hydrogen atom bonded to nitrogen, or oxygen, or fluorine form a strong dipole-dipole interaction and hydrogen bonding. Primary amines (e.g., IPA) undergo hydrogen bonding. Thus, such amines are polar solvents and completely miscible in water. However, they are less polar than alcohols. This stems from the fact that the N—HN hydrogen bond between amine molecules is weaker than the O—HO hydrogen bond because nitrogen is less electronegative than oxygen, which results in low boiling points of primary amines.

Nitrogen ($N_2$) can form compounds with only three covalent bonds to other atoms. A molecule of amine contains $sp^3$-hybridized nitrogen atom bonded to one or more carbon atoms. The nitrogen has one orbital filled with a pair of unshared valence electrons, which allows these compounds to act as bases. Amines are therefore weak bases that could undergo reversible reactions with water or other weak acids.

Nitrous oxide ($N_2O$) or $N_2$ can be possible modifiers for the selected amine solvents. $N_2O$ and $N_2$ are miscible in amine solvents, and not acidic. $N_2O$ is a non-toxic low polarity fluid with favorable critical properties. $N_2$ is an inert species with a very low critical temperature (126.2 K), and a moderate critical pressure (33.4 atm or 490.8 psi) that is close to the critical pressures of the selected amine solvents. This could provide a critical temperature for a mixture of $N_2$ (as a gas or as a liquid) and a selected amine solvent that lies proximate to ambient temperature.

Since $N_2$ and $N_2O$ are sparingly miscible in water, however, the chosen modifier must be premixed and completely homogenized with the amine solvent before injection into the precipitator unit. As such, the proportion of $N_2$ or $N_2O$ to the amine solvent must be carefully optimized to prevent any negative effects on the desired properties of the amine solvent in water.

The CPP Processing System

Figure 10:
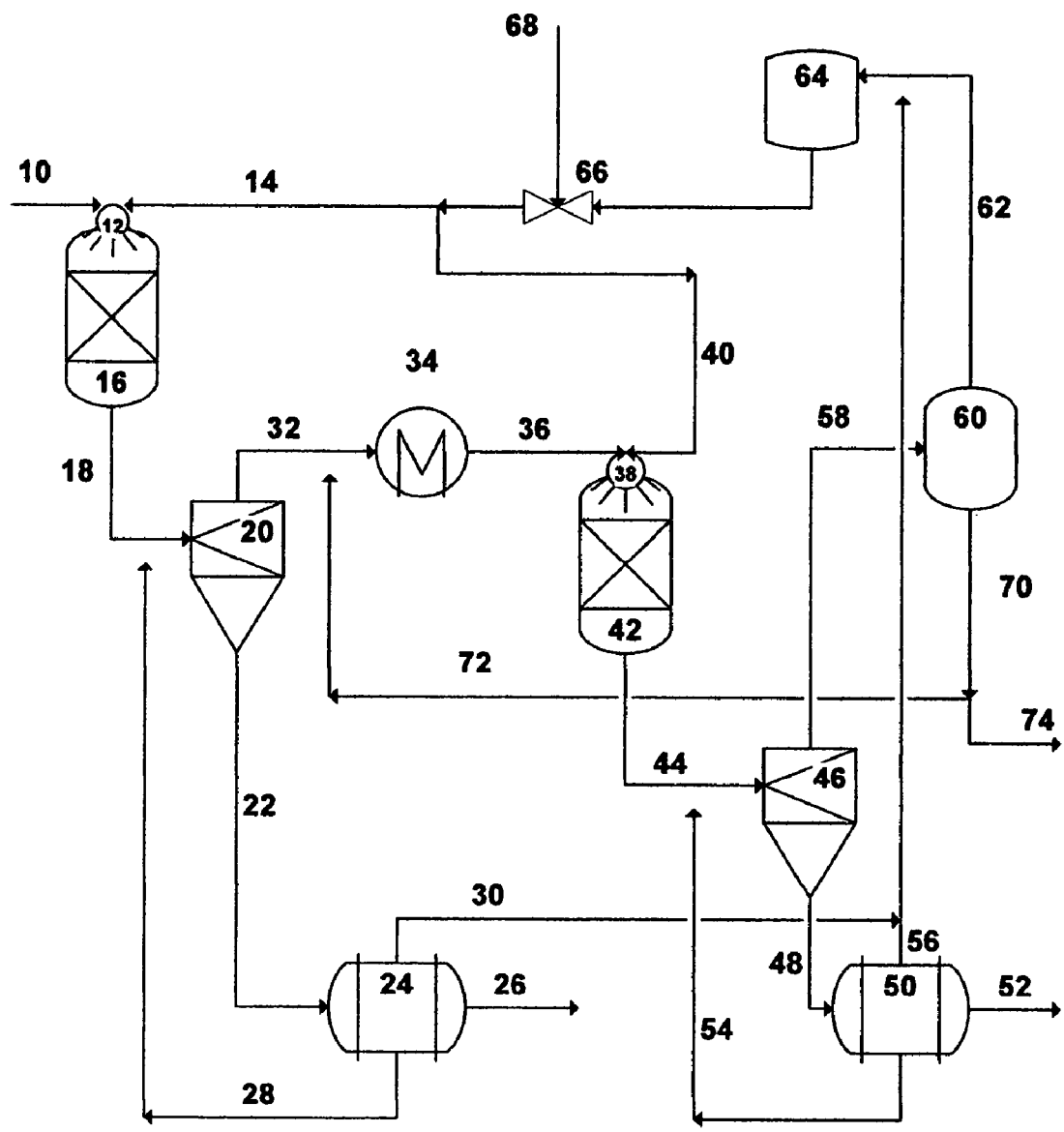
FIG. 10 illustrates a simplified flow sheet for the CPP processing system.

Reference is now made to FIG. 10, which depicts a simplified possible flow sheet illustrating the treatment of ADW by a dual-stage CPP process. The first stage will target the removal of sulfate scale species (gypsum, celestite and barite), toxic species (selenium, boron, and transition metals) and brucite. Once such relatively small amounts of sulfate scale and impurities are removed, the second stage will target the separation of sodium sulfate (preferably in the anhydrous form) from sodium chloride. Multiple stages of CPP, however, can also be implemented.

A possible approach for pressurizing the ADW stream and the amine solvent into the precipitator unit is to use a concentric nozzle where the ADW stream is pressured through the inner tube of the nozzle while the amine solvent is pressured through coaxial annulus of the same nozzle. Multiple concentric nozzles can also be installed within a single precipitator unit. It should be pointed out that the compressed amine solvent and the ADW stream can also be injected into the precipitator unit via two separate spray nozzles.

As shown in FIG. 10, the ADW stream [10] will be delivered into the first-stage precipitator unit [16] preferably via the inner tube of at least one concentric nozzle [12]. The pressure of such a stream is between about 200 and 1,000 psi. A selected amine solvent [14] will be pressurized into the precipitator unit [16] at a pressure ranges between about 200 psi and the critical pressure of the amine solvent through the coaxial annulus of the same concentric nozzle. The outlet stream [18] from the first-stage precipitator unit [16] will be fed into the first-stage hydrocyclones to separate the formed precipitates from the stream.

Precipitates in the under flow stream [22] of the first-stage hydrocyclones [20] will be transferred into a dewatering vacuum filter [24]. The preference of using a vacuum filter instead of a press filter or a centrifugal filter is to recover any remaining amine solvent [30] from the under flow stream [22]. The recovered amine solvent [30] will be condensed and returned to the amine solvent storage tank [64]. Dewatered precipitates [26] (presumably gypsum, celestite, barite, selenium, boron, metals, and brucite) could be disposed of in deep injection wells or onsite waste-sink ponds or offsite disposal facility. For instances, there are thousands of abandoned deep oil wells and dry holes in the Southern San Joaquin Valley that can be used for disposal purposes.

The aqueous stream [28] from the dewatering vacuum filter [24] can be recycled to the feed stream [18] of the first-stage hydrocyclones [20]. It should be noted that a thickener tank (not shown in FIG. 10) can be installed a head of the dewatering vacuum filter [24] to further thicken precipitates. The thickener tank can also be used to provide a buffer storage capacity, and/or to allow a more rigorous recovery of any remaining amine solvent from the under flow stream [22] of the first-stage hydrocyclones.

The over flow stream [32] of the first-stage of hydrocyclones [20] that contains the aqueous stream (nearly rich in sodium sulfate and sodium chloride) and the amine solvent will be fed into a heat exchanger [34] for temperature elevation (between 313 and 323K). Elevating the temperature of the over flow stream [32] would allow the precipitation of sodium sulfate in the desired anhydrous form. Thermal energy to feed the heat exchanger [34] can be extracted, for instance, from a simple ADW solar pond or from the lower zone of the more advanced SGSP or from any other solar collector or wind generator. It should be noted that the heat exchanger [34] can be eliminated if: (1) the desired form of sodium sulfate is decahydrate not anhydrous; or (2) the source of ADW is a solar pond or basin (not sumps) in which the stream is hot (temperature above 313 K) and more concentrated.

The heated aqueous stream [36] from the heat exchanger [34] will be delivered into the second-stage precipitator unit [42] preferably via the inner tube of at least one concentric nozzle [38]. The pressure of such a stream is between about 200 and 1,000 psi. The amine solvent will be delivered [40] into the second-stage precipitator unit [42] at a pressure range between 200 psi and the critical pressure of the amine solvent through the coaxial annulus of the same concentric nozzle. The outlet stream [44] from the precipitator unit [42] will be fed into the second-stage hydrocyclones to separate the precipitates of sodium sulfate anhydrous from the stream.

Sodium sulfate has a relatively high heat of transition ($Na_2SO_4$:128 BTU per pound; and $Na_2SO_4.10H_2O$:108 BTU per pound). Heat of transition occurs when sodium sulfate undergoes a phase change (e.g., from the liquid phase to the solid phase, or vice versa) or a change within the same phase (e.g., from one precipitate form to another within the same solid phase). This valuable characteristic of sodium sulfate can be used effectively within the processing steps of CPP (as well as in constructing a very effective SGSP for power supply).

Within the CPP processing steps, the heat of transition from the precipitated sodium sulfate in the second-stage precipitator unit [42] is ideal for effective recovery of the amine solvent from the over flow [58] and under flow [48] streams of the second-stage hydrocyclones [46]. In addition, the heat of transition within the outlet stream [44] of the second-stage precipitator unit [42] can be diverted to supply thermal energy to the heat exchanger unit [34]. Such a heat diversion is more feasible if the source of ADW [10] is solar ponds or basins in which the original ADW is hot, and the purpose of the heat exchanger unit [34] is to compensate for the heat loss through the first-stage of precipitator unit [16] and hydrocyclones [20].

The mainly sodium sulfate anhydrous precipitates in the under flow stream [48] of the second-stage of hydrocyclones [46] will be transferred into a dewatering vacuum filter [50]. Dewatered precipitates [52] can be recovered as a valuable commodity. The produced sodium sulfate anhydrous can be used in several industries (e.g., soap and detergents, pulp and paper, textiles, glass, carpet fresheners, etc.).

The aqueous stream [54] from the dewatering vacuum filter [50] that contains very fine precipitates and/or dissolved sodium sulfate can be recycled to the feed stream [44] of the second-stage hydrocyclones [46]. The recovered amine solvent [56] will be condensed and recycled to the amine solvent storage tank [64]. A thickener tank (not shown in FIG. 6) can also be installed before the dewatering vacuum filter [50] to further thicken precipitates.

The over flow stream [58] of the second-stage hydrocyclones [46] that contains an aqueous stream (rich with mainly sodium chloride) and the amine solvent will be fed into a vapor-liquid equilibrium based stripping unit [60] to separate the sodium chloride rich aqueous stream [70] from the amine solvent [62]. The stripping unit [60]] could be a simple flash drum, a vacuum or a standard distillation tower, a vacuum membrane distillation unit, or a pervaporation unit. The recovered amine solvent [62] will be condensed and recycled to the amine solvent storage tank [64].

An optimum portion [72] of the sodium chloride rich aqueous stream [70] will be recycled for mixing with the feed stream of the heat exchanger [34]. The purposes of this recycling mode are to: (1) depress the solubility limit of sodium sulfate before the second-stage precipitator unit [42]; and (2) capture some of the remaining amounts of sodium sulfate that are not precipitated.

The other portion of sodium chloride rich aqueous stream [74] can be used to: (1) irrigate salt tolerant crops (e.g., for various salt-tolerant trees, grasses, and halophytes); and/or (2) irrigate low salt tolerant crops (e.g., cotton and grasses) after mixing with irrigation water; and/or (3) construct SGSP to produce energy; and/or (4) produce sodium chloride salt by simple solar stills. Sodium chloride salts can be utilized in different applications (e.g., for livestock feeding, roads de-icing, etc.).

The amine solvent can also be modified with $N_2$ or $N_2O$ [68] in a mixer [66] to mainly reduce the critical temperature of the amine solvent. The well-mixed miscible binary mixture of the selected amine solvent and its modifier ($N_2$ or $N_2O$) will be pressurized into the precipitator units [16] and [42] instead of a pure amine solvent.

Figure 1:
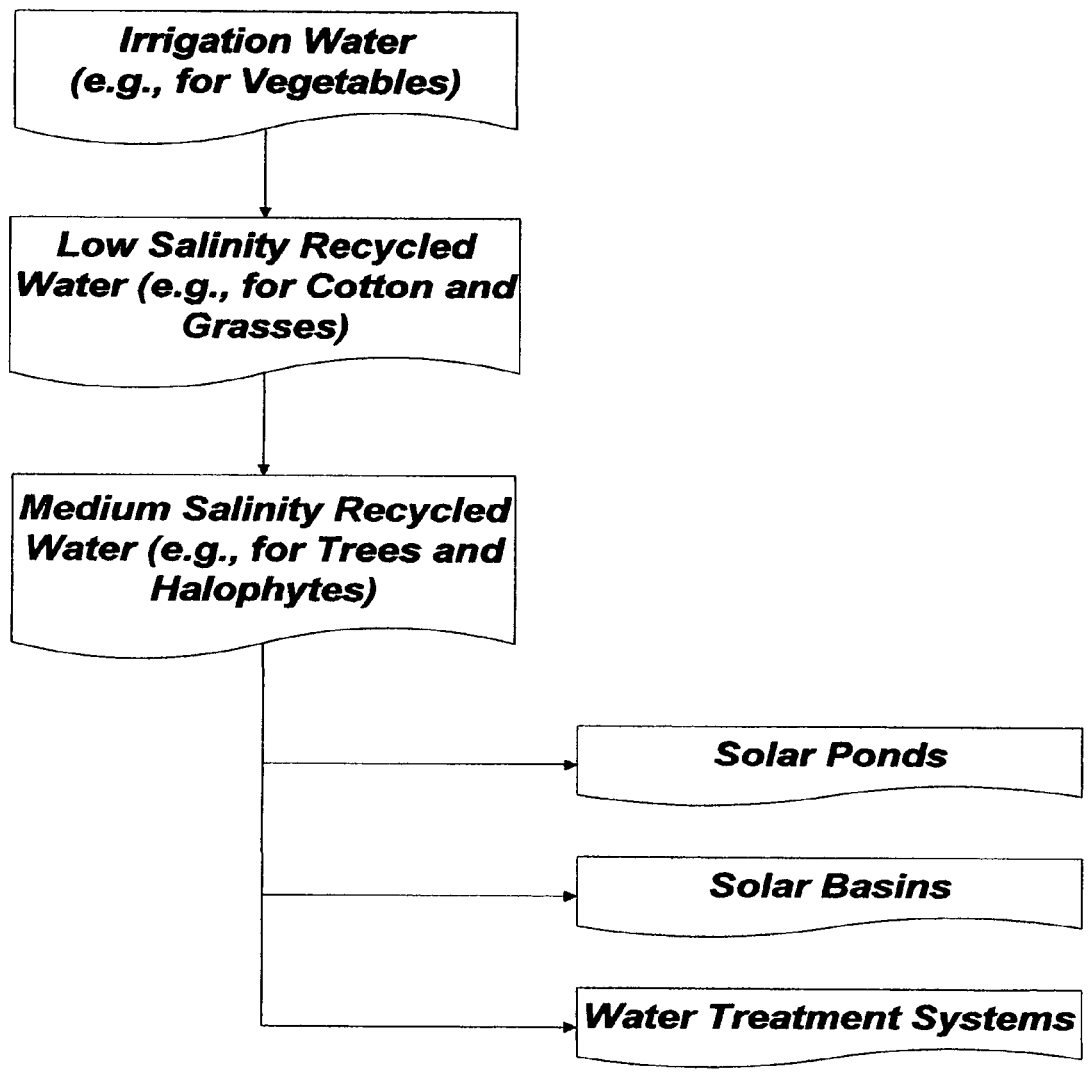
FIG. 1 illustrates the stages of the On-Farm Drainage Management (IFDM) system.
Figure 2:
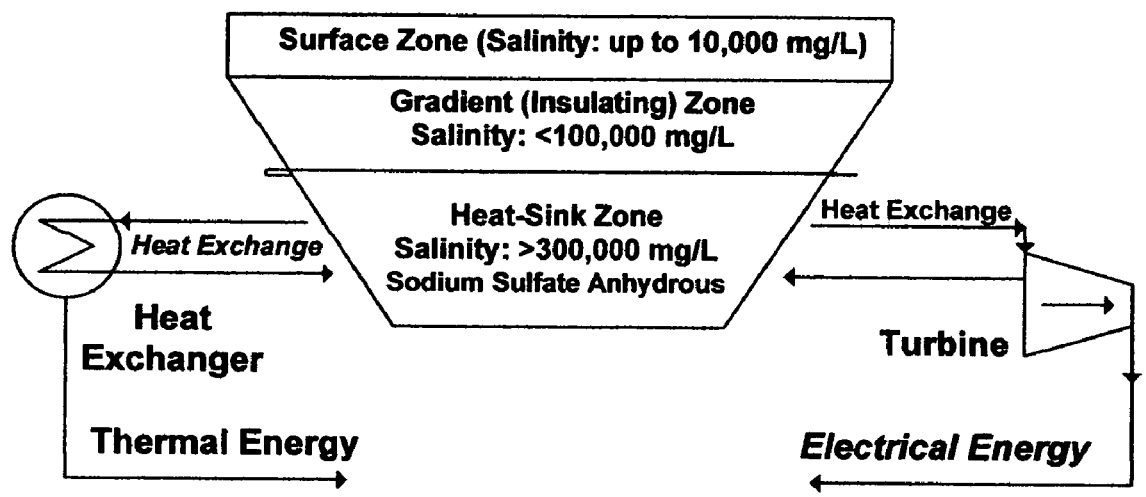
FIG. 2 illustrates a simplified structure of salt-gradient solar ponds SGSP).

Some of the recovered sodium sulfate anhydrous [52] and/or [54] can also be used to supply the heat-sink zone of SGSP (FIG. 2). In this case, a portion of the produced sodium chloride rich aqueous stream [74] can be utilized in the gradient and surface zones at different concentration levels. A hot stream from the heat-sink zone of the SGSP will be connected to a heat exchanger (for thermal energy) or a turbine (for electrical energy). However, the temperature of the return stream from the heat exchanger or the turbine to the SGSP must be kept: (1) above the transition temperature (305.5K) to prevent the formation of sodium sulfate decahydrate (split phase), and thus the consequent loss of ability to store heat; or (2) about ambient temperature (298.2K) if sodium chloride is added into the heat-sink zone in an appropriate amount to prevent the formation of sodium sulfate decahydrate (see FIG. 6). Since the temperature of the surface zone of SGSP is about ambient or slightly lower, it can be used as a cooling source for any thermal units within the CPP processing system. SGSP could thus supply thermal or electric energy to entirely operate the CPP process.

NF-CPP or RO-CPP Processing Systems (Low Salinity ADW)

NF and RO as stand alone systems are both experimented for the treatment of a low salinity ADW. NF is tested for the selective removal of the combined divalent oxy-anions (sulfate, selenate, and selenite). Table 4 shows the rejection of ions from a low salinity ADW (14,400 mg/L of TDS) by NF (Kharaka, Y. K., et al., "Removal of Selenium from Contaminated Agricultural Drainage Water by Nanofiltration Membranes", Applied Geochemistry (1996) 11: 797-802).

The rejection values of selenate ($Se^{+6}$) are very high (96-99%) and comparable to the rejection values of sulfate. The rejection values for selenite ($Se^{+4}$) range between 72 and 79%, and slightly increase with increasing the pH values (7.6 to 8.5). If the reported NF data is correct, NF within a 50% throughput ratio is capable of reducing the concentrations of selenium from the reported low salinity ADW to less than or about the EPA limit (5 μg/L). At throughput ratios higher than 50%, however, NF is incapable of meeting the EPA limit for selenium. It should be noted that when the tested low salinity ADW is diluted by 60% with de-ionized water and spiked with high concentrations of selenium (4.5 mg/L of $Se^{+6}$ and 2.5 mg/L of $Se^{+4}$), the rejection values of selenium are significantly decreased, particularly for $Se^{+4}$.

The rejection values of divalent cations (magnesium, calcium, and strontium) are also very high (94-98%) and comparable to the rejection values of sulfate. The rejection values of monovalent cations (sodium and potassium) are abnormally high (78-89%). This is attributed to two factors. The first factor is the high concentration of sulfate compared to chloride in the NF feed stream (e.g., the ratio of sulfate to chloride in the initial feed stream is 7:1). The second factor is that sodium as the predominant cation should balance the highly reject sulfate (predominant anion) to satisfy electro-neutrality across NF membrane (for every removed anion, one cation must be removed).

The rejection values for monovalent anions such as chloride and nitrate (as well as bicarbonate at higher throughput ratios) are negative. This means that their concentrations in the product stream are higher than their correspondent concentrations in the feed stream. This situation can be explained by the facts that most of sodium is rejected as $Na_2SO_4.10H_2O$ at ambient temperature. Each mole of $Na_2SO_4.10H_2O$ contains two moles of sodium, one mole of sulfate, and ten moles of water. As such, the water content in $Na_2SO_4.10H_2O$ is about 77%. In addition, $Na_2SO_4.10H_2O$ has poor nucleation properties that lead to a high degree of supersaturation before forming precipitates. Since water is consumed during the supersaturation of $Na_2SO_4.10H_2O$, the product stream is richer in sodium-chloride than the feed stream due to the loss of hydration water. Table 4 reveals that is indeed the case. It is worth noting that the concentrations of sodium chloride in the product stream slightly decrease with increasing throughput ratios.

I have used my model to predict the actual rejection ($R_a$) in the absence of concentration polarization and ions concentrations at the NF membrane surface ($C_m$). I have also estimated ions concentrations in the concentrate stream ($C_C$) from the material balance around the NF Module. The predicted values of $R_a$, $C_m$ and $C_C$ (Table 4) facilitate the prediction of the hydraulic and scale boundaries. One of the factors that shape such boundaries is the throughput ratio which, in turn, is governed by salinity, scale tendency, and temperature.

The predicted $C_m$ values are very important to determine: (1) the actual osmotic pressure drop across the NF membrane; and (2) the saturation degree of scale-prone species (e.g., gypsum, celestite, barite, etc.) that precipitates on the surface and inside the pores of the membrane. It is worth noting that gypsum precipitates are needle-like that could scratch the delicate membrane layer that is responsible for the selectivity of ions rejection. The operating cost is directly proportional to the cost of these two factors: (1) power consumption for applying higher operating pressures to exceed the natural osmotic pressure of the ADW and achieve acceptable levels of throughput; (2) chemicals to inhibit and/or dissolve scale deposits; and (3) membranes maintenance and replacement.

The water flux as expressed in terms of the flow rate of the product stream ($Q_P$) can be given as:

$$Q_P = K_w A_m [\Delta P - \sigma \Delta \pi] \quad (1)$$

where $K_w$ is the water permeability coefficient through the membrane, $\Delta P$ is the applied pressure difference across the membrane, $\Delta \pi$ is the osmotic pressure difference between the membrane surface ($\pi_m$) rather than the feed stream ($\pi_F$) and the product stream ($\pi_P$), and $\sigma$ is the reflection coefficient. The reflection coefficient represents the actual rejection ($R_a$) in the absence of concentration polarization. In RO membranes, $R_O$ is typically about 98% for most ions, and thus $\sigma$ can be assumed equal to unity. In NF membranes, however, $R_O$ is less than 98% for most ions (except sulfate), particularly for monovalent anions. Thus, $R_a$ ($\sigma$) is a key factor in accurately predicting $\Delta \pi$.

The osmotic pressure (psi) of a saline stream can be estimated as follows:

$$\pi = 1.19 T \Sigma M_i \quad (2)$$

where T is the temperature (K), and $M_i$ is the molar concentration of individual ions (mol/L). I have validated Eq. (2) against actual osmotic pressure values of sodium chloride (between 500 and 41,000 mg/L). Within the tested concentrations of sodium chloride at 298.15K, Eq. (2) over predicts the osmotic pressures by 2-6%.

To accurately estimate the values of osmotic pressures at the membrane surface ($\pi_m$), and in the product stream ($\pi_P$), all ions must be considered. As such, I have modified Eq. (2) to account for the actual rejection of each individual ion as follows:

$$\pi = 1.19 T \Sigma R_{ai} M_i \quad (3)$$

The values of $\pi_m$ and $\pi_P$ from Eq. (3) include the correction ($\sigma$ or $R_a$) in the absence of concentration polarization.

The estimated values of $\pi_P$ and $\pi_m$ at different throughput ratios are presented in Table 5. Although most of sodium is rejected along with sulfate to satisfy electro-neutrality, an appreciable gap exists between the predicted concentrations of sulfate and sodium at the membrane surface. For instance, at 65.8% throughput ratio, the sulfate concentration at the membrane surface is about 13-fold higher than the sodium concentration. The abundance of sulfate at the membrane surface is attributed to the: (1) relatively high initial concentration of sulfate in the feed stream; (2) experimental setup in which the NF concentrate stream for each increment in the throughput ratio is recycled to the feed tank to provide a partial recycle mode that progressively and aggressively increases ions (particularly sulfate) concentrations in the feed stream; and (3) high rejection of sulfate at all throughput ratios. Therefore, the predicted values of $\pi_m$ are relatively high, particularly at higher throughput ratios.

The excess concentration of sulfate at the membrane surface can possibly exist as:

$$SO_4^{-2} + H_2O \Leftrightarrow HSO_4^- + OH^- \quad (4)$$

The release of the hydroxide ion would increase the pH values. The NF experimental data reveals that as throughput ratio increases, the pH values increase (e.g., at throughput ratio of 76.6%, the pH value is 8.5). If the $HSO_4$ is assumed to be a neutral species, then the corrected values of $\pi_m$ can be based only on the exact concentration of sulfate that associates, for instance, with sodium, calcium, and strontium ions. Table 5 also presents the corrected values of $\pi_m$.

The exact experimental values of applied pressures ($\Delta P$) for each increment in the throughput ratio are not reported. However, it is generally stated that the operating pressures are between 290 and 870 psi. It is also stated that at 75% throughput ratio, gypsum starts to precipitate. The predicted values of $\Delta \pi$ based on the corrected values of $\pi_m$ appear to be within the applied pressures.

Table 4 reveals that gypsum and celestite are supersaturated at all throughput ratios both at the membrane surface and in the concentrate stream. Their saturation aggressively increases with increasing throughput ratios. The saturation of gypsum and celestite is higher at the membrane surface than in the concentrate stream. It is worth noting that the formation of celestite scale has not been of concern in the design of NF or RO for the treatment of scale-prone streams. The formation of celestite scale could act as a seeding agent in initiating and speeding gypsum precipitation.

Table 4 indicates that $Na_2SO_4 \cdot 10H_2O$ is under saturated at the membrane surface at all throughput ratios. $Na_2SO_4 \cdot 10H_2O$ is also under saturated in the NF concentrate stream except at the highest throughput ratio (76.6%) where it's saturated.

RO membranes are capable of almost equally removing both monovalent and polyvalent ions including selenium. RO is thus capable of producing potable water (TDS about 500 mg/L). However, factors such as pretreatment levels, power consumptions (applied pressures), ions selectivity and rejection, and the purposes of treating ADW (e.g., production of potable water or salts or both) determine the economic applicability of NF or RO to treat low salinity ADW.

Coagulation and filtration of suspended matters from ADW by micron filters are required for both types of membranes. Since both NF and RO membranes highly reject divalent cations (mainly calcium and strontium) combined with the fact that ADW at all salinity levels are near saturation with gypsum, the precipitation of gypsum, celestite, and calcite at the membrane surface and in the concentrate stream would be significant. The precipitation of carbonate scale can be controlled by acid pre-treatment. However, the precipitation of sulfate scale can be either: (1) delayed by operating NF or RO at low throughput ratios; (2) delayed by scale inhibitors; or (3) prevented by pre-treatment with ion exchangers that are selective for sparingly soluble alkaline cations (calcium, strontium, and barium). The pre-treatment levels for NF and RO membranes are thus comparable.

ADW at different salinity levels are sulfate-rich (sodium sulfate) rather than chloride-rich (sodium chloride) saline stream. The high selectivity and rejection of NF membranes for sulfate require the high rejection of both divalent and monovalent cations to maintain electro-neutrality. With the exception of chloride and other minor monovalent anions (nitrate and bromide), the rejection values for the rest of ions are comparable between RO and NF membranes. However, the $\Delta\pi$ values across RO membranes are expected to be slightly higher than across NF membranes due to the high rejection of monovalent anions. Consequently, the differences in osmotic pressures across the membrane are very narrow between NF and RO. As such, the required applied pressures in NF or RO to exceed the osmotic pressures of ADW are about the same. This means that there is no clear advantage for NF over RO in power consumption.

The high removal of sulfate along with toxic selenium and transition metals from ADW by NF or RO membranes is not always advantageous. Such a non-discriminative removal does not allow a direct recovery for the bulk of sodium sulfate (and sodium chloride in the case of RO) from the small amounts of toxic species. Thus, NF or RO concentrate streams require either further treatments to segregate sodium salts (sulfate or sulfate-chloride) from toxic species or a safe waste-sink to dispose of huge amounts of contaminated salts (bout 600,000 tons per year).

NF or RO can be innovatively integrated with CPP to provide zero discharge systems. Different configuration of flow sheets can be implemented. The configuration of NF—CPP or RO—CPP flow sheets depends on: (1) the purpose of treating ADW; and (2) the use (if any) of preventive pretreatment measures to minimize or eliminate sulfate scale (gypsum, celestite, and barite).

Figure 11A:
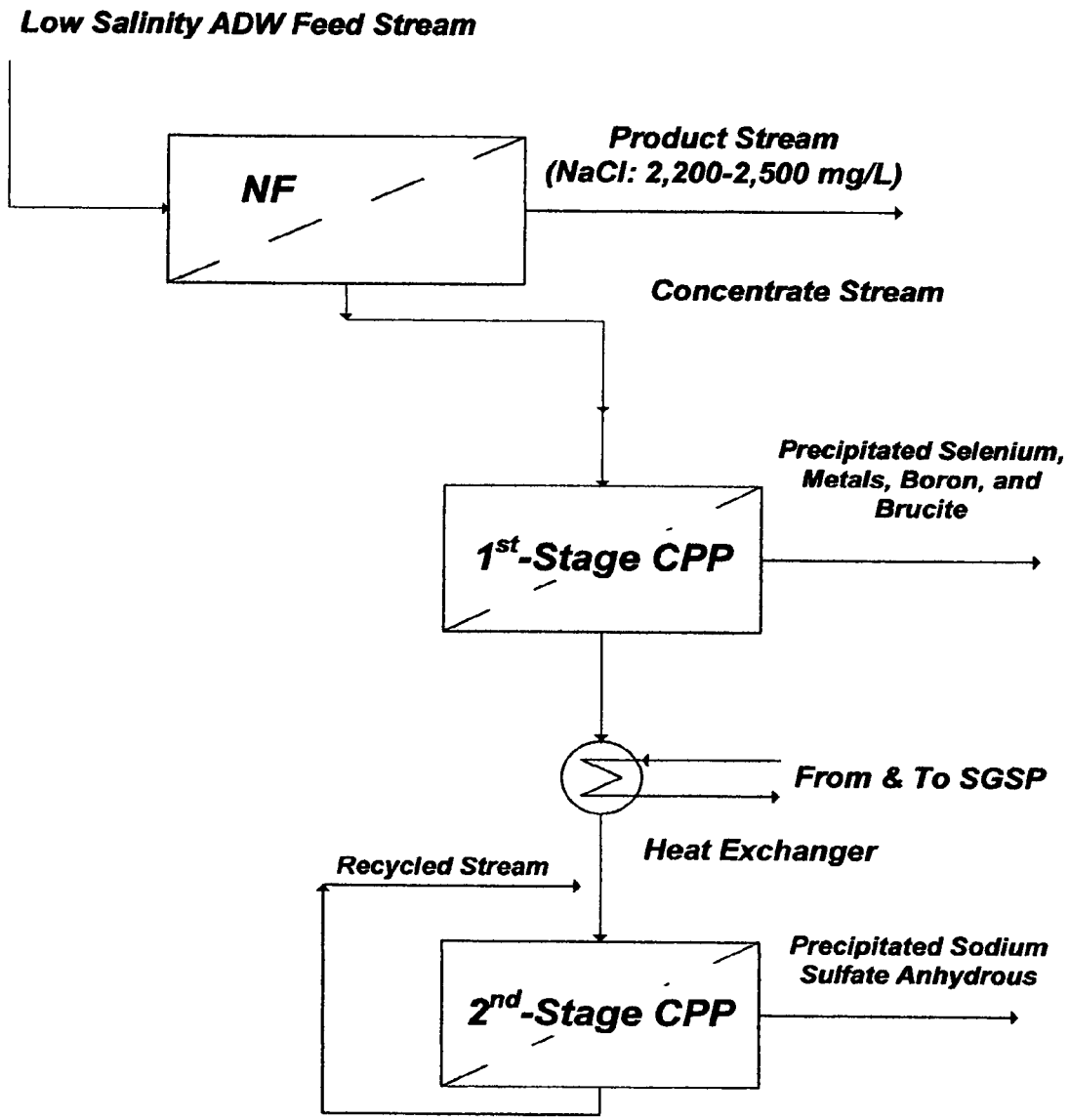
FIG. 11A illustrates the integration of NF with a dual-stage CPP post-treatment.

FIG. 11A shows a simplified flow sheet for the integration of NF with CPP assuming the purpose of treating ADW is the recovery of sodium sulfate, and preventive sulfate scale pre-treatment is taken. CPP is implemented in a dual-stage post-treatment to remove impurities (selenium, metals, boron, and brucite) from the NF concentrate stream, and to recover an acceptable quality of sodium sulfate anhydrous.

Figure 11B:
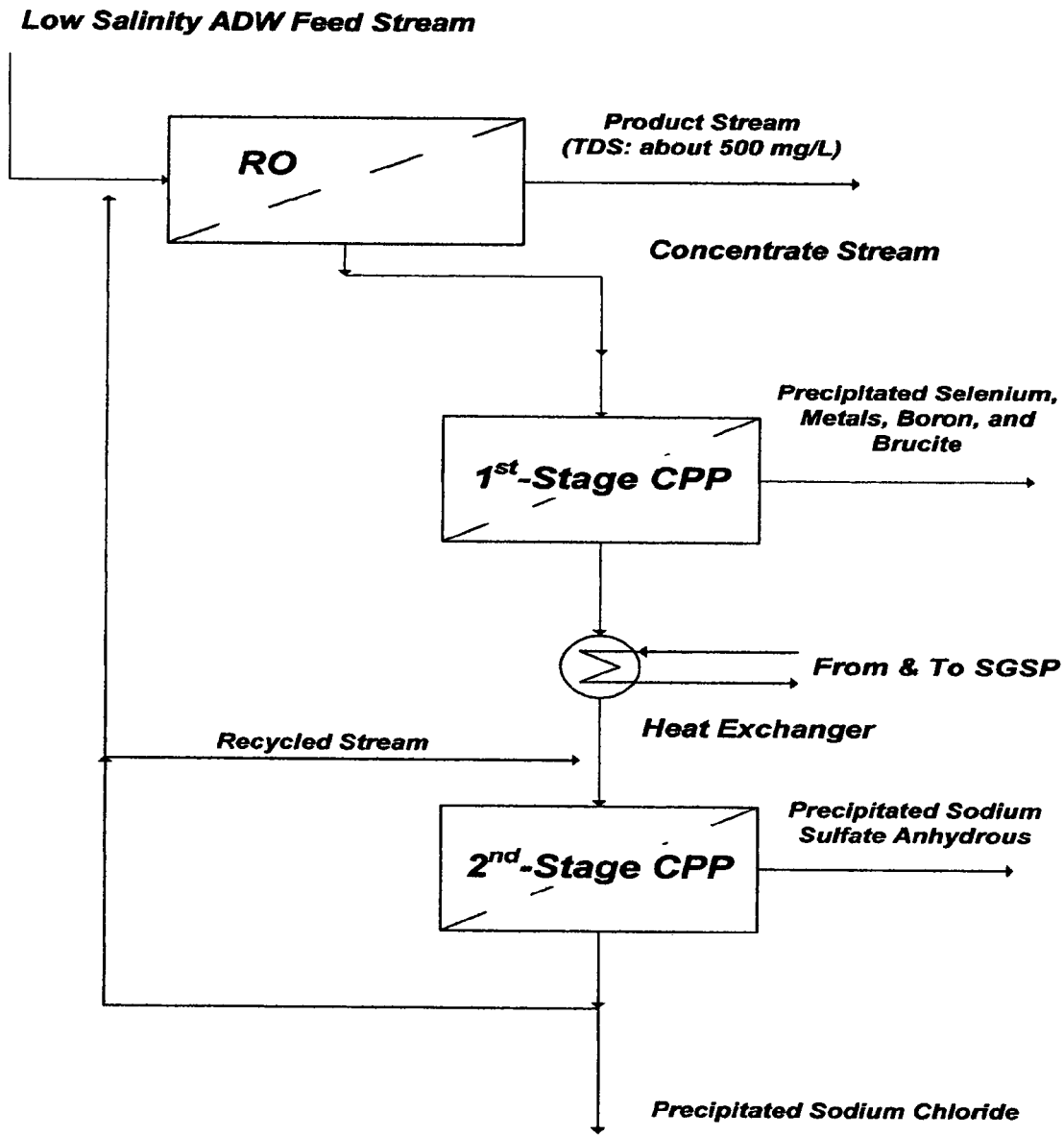
FIG. 11B illustrates the integration of RO with a dual-stage CPP post-treatment.

FIG. 11B shows a simplified flow sheet for the integration of RO with CPP. It is assumed that: (1) the purpose of treating ADW is the recovery of potable water; and (2) preventive sulfate scale pretreatment is taken. CPP is employed in a dual-stage post-treatment for removing impurities from the RO concentrate stream, and for separating sodium sulfate anhydrous from sodium chloride.

Figure 12A:
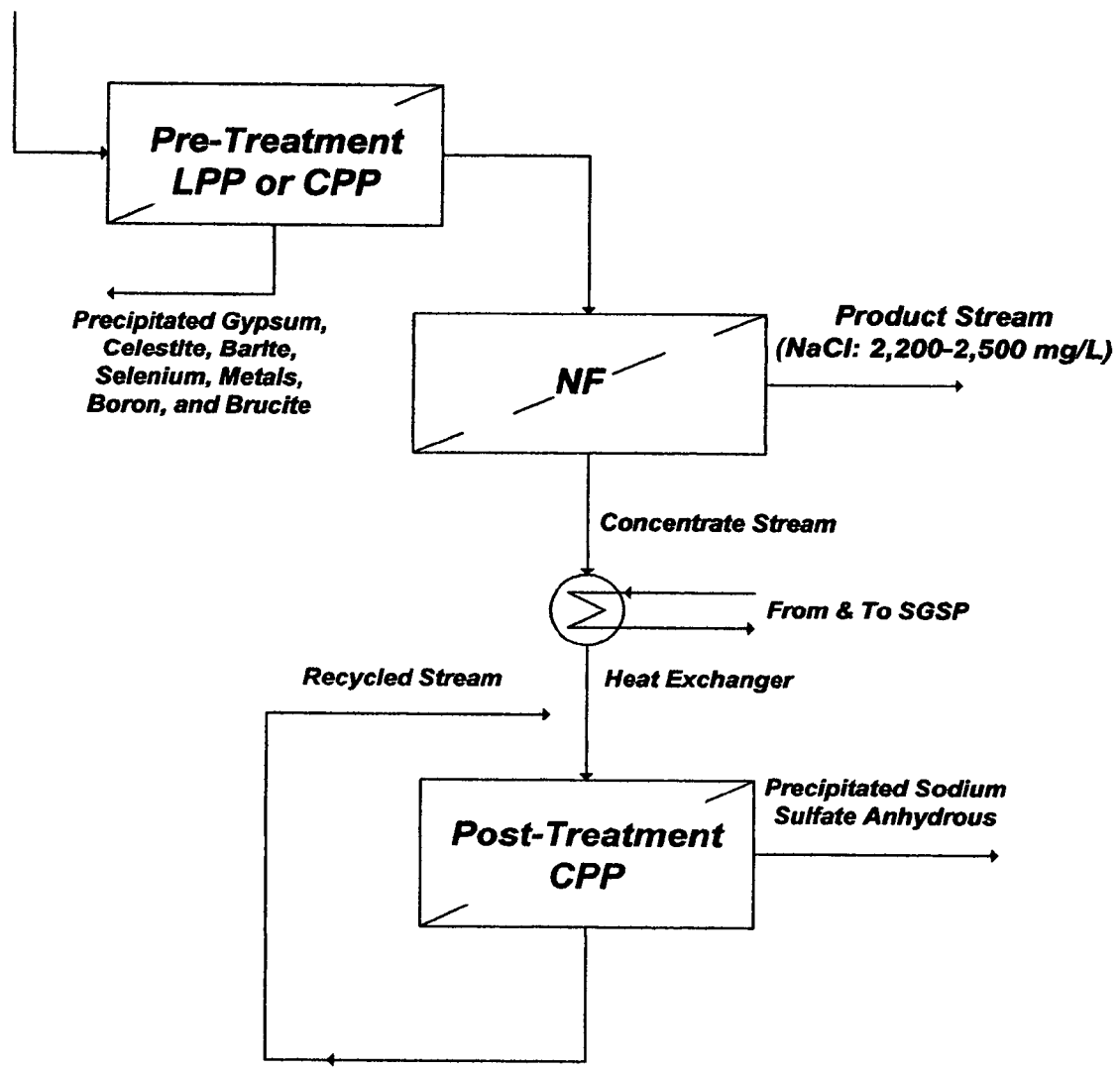
FIG. 12A illustrates the integration of NF with single-stage CPP as pre-treatment and post-treatment steps.

FIG. 12A depicts a simplified flow sheet for the integrated NF—CPP processing system assuming that the purpose of treating ADW is the recovery of sodium sulfate, and preventive sulfate scale pretreatment is not taken. CPP is implemented in a single-stage: (1) pre-treatment to remove sulfate scale (gypsum, celestite, and barite) and impurities (selenium, metals, boron, and brucite) from the NF feed stream; and (2) post-treatment to recover an acceptable quality of sodium sulfate anhydrous from the NF concentrate stream.

Figure 12B:
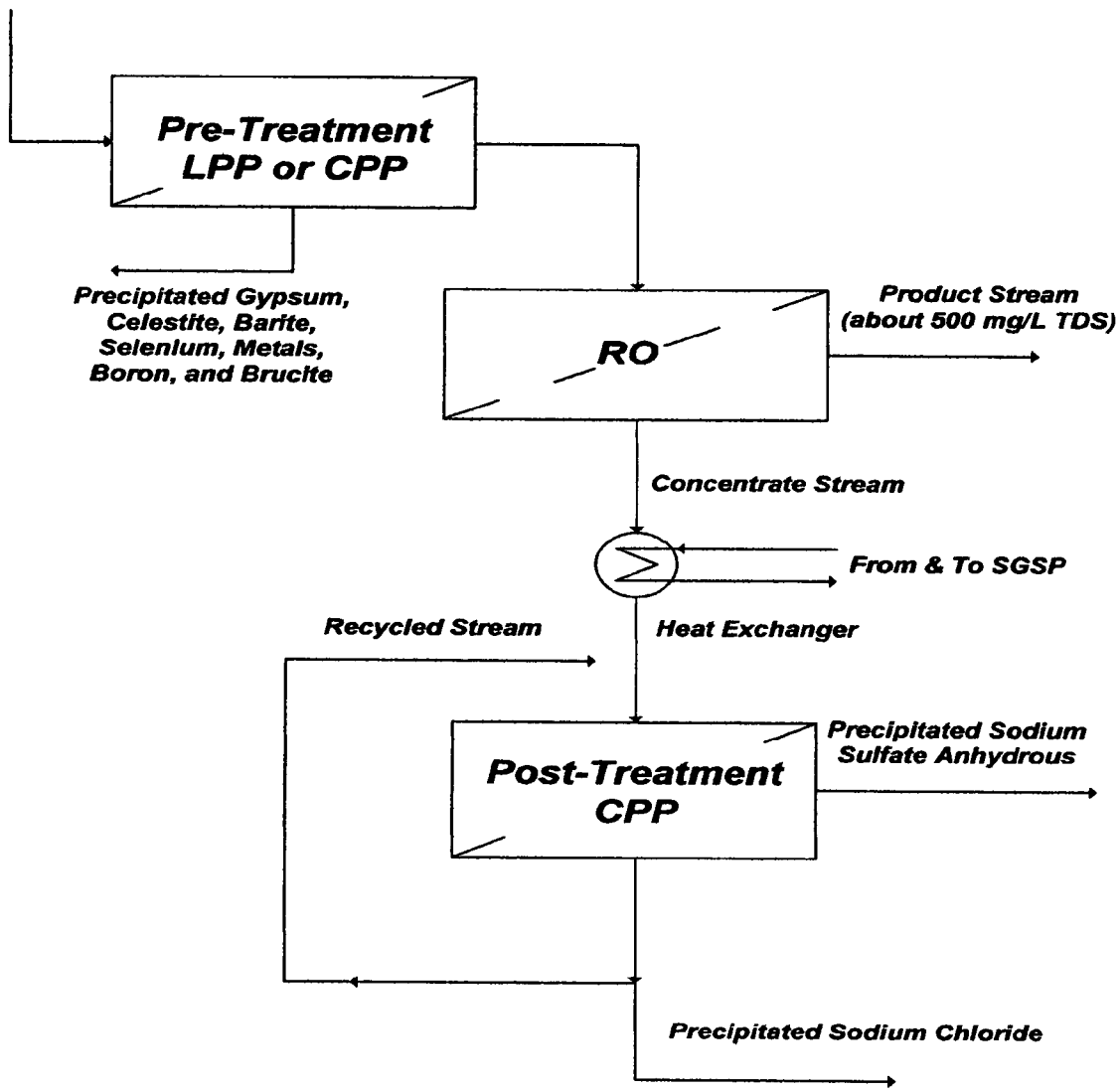
FIG. 12B illustrates the integration of RO with single-stage CPP as pre-treatment and post-treatment steps.

FIG. 12B shows a simplified flow sheet for the integrated RO—CPP processing system. It is assumed that the purpose of treating ADW is the recovery of potable water, and preventive sulfate scale pretreatment is not taken. CPP is implemented in a single-stage: (1) pre-treatment to remove sulfate scale and impurities from the RO feed stream; and (2) post-treatment for the RO concentrate stream to segregate sodium sulfate anhydrous from sodium chloride.

In NF or RO systems, the product stream is produced at near atmospheric pressure whereas the concentrate stream is produced at approximately 20 to 50 psi below the pressure of the feed stream. Thus, the pressure of the NF or RO concentrate stream has a valuable energy input that can be innovatively utilized in conducting the CPP in a dual-stage (FIGS. 11A and 11B) or a single-stage post-treatment (FIGS. 12A and 12B). This invention would make NF or RO systems technically, economically, and ecologically more attractive.

For the cases that are depicted in FIGS. 11A and 11B, the NF or RO concentrate stream [10] will be fed into the first-stage precipitator unit [16] as shown in FIG. 10 using its inherited hydraulic energy. In the case of using RO, the rest of the operational steps [12 to 74] are identical to the operational steps as described in the above section of the CPP processing system. In the case of using NF, however, the aqueous stream [70] that contains only dissolved sodium sulfate anhydrous (no sodium chloride) will be recycled [72] to the feed stream [32] of the heat exchanger [34], or a portion of it [74] will be diverted to construct the heat-sink zone of SGSP.

Figure 13:
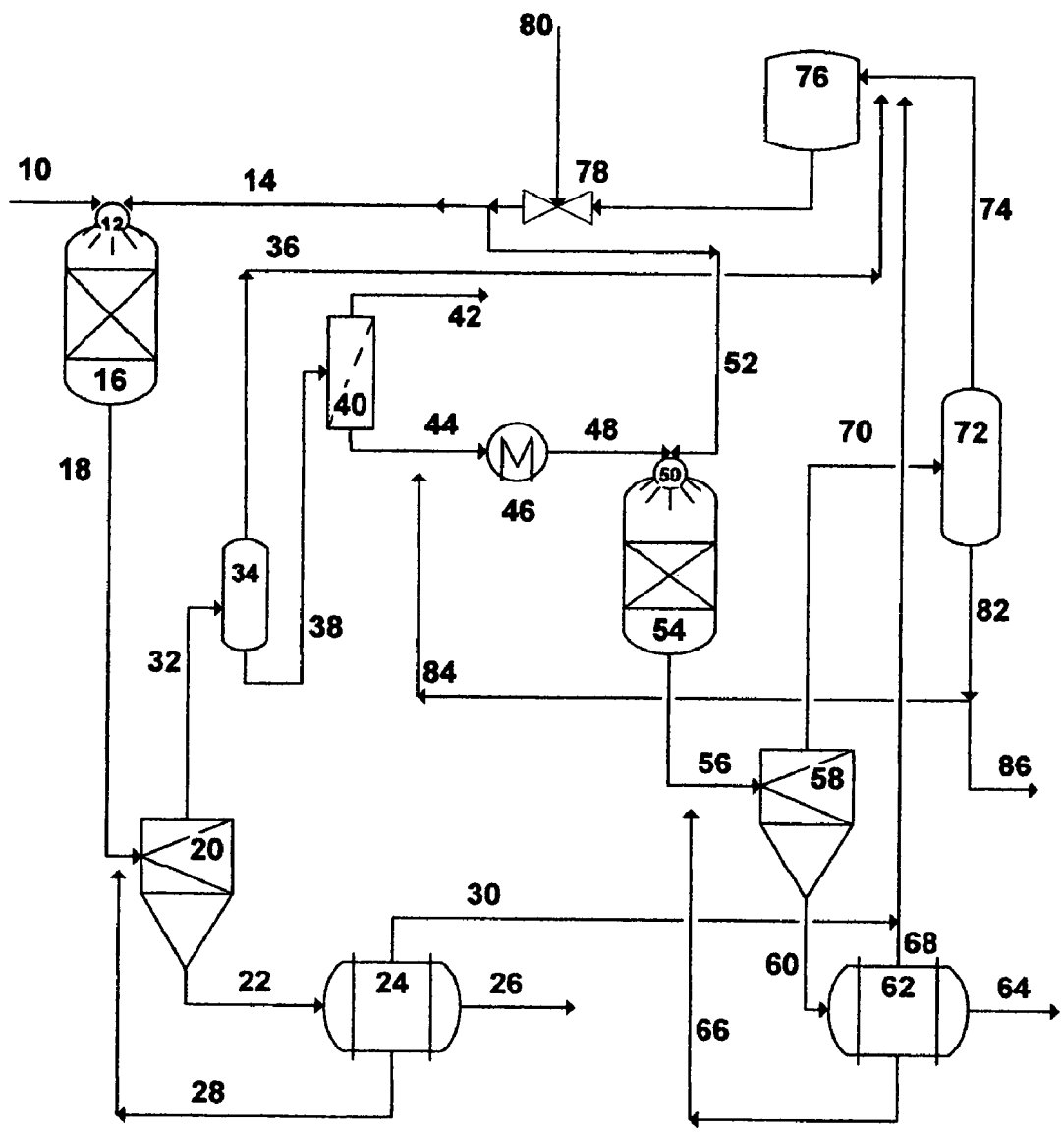
FIG. 13 illustrates a simplified flow sheet for the integration of NF or RO with CPP.

For the cases that are depicted in FIGS. 12A and 12B, FIG. 13 shows a simplified possible flow sheet illustrating the use of CPP as a pre-treatment and a post-treatment for either NF or RO. The processing steps [10 to 32] as shown in FIG. 10 and described in the above section of the CPP processing system are identical to the processing steps [10 to 32] as given in FIG. 13. In FIG. 13, however, the over flow stream [32] from the first-stage hydrocyclones will be fed into a vapor-liquid equilibrium based stripping unit [34] to separate the aqueous stream [38] from the amine solvent [36]. The stripping unit [34] could be a simple flash drum, a vacuum or a standard distillation tower, a vacuum membrane distillation unit, or a pervaporation unit. The recovered amine solvent [36] will be recycled to the solvent storage tank [76].

The aqueous stream [38] from the stripping unit [34] will be fed into the NF or RO stage [40]. NF or RO can be conducted in a single stage or multiple stages. The final concentrate stream [44] from NF or RO stage [40] will be fed into a heat exchanger [46]. The processing steps [46 to 86] as shown in FIG. 13 are identical to the processing steps [34 to 74] as shown in FIG. 10 and as described in the above section of the CPP processing system.

If RO is employed as shown in FIG. 13, the final product stream [42] can be used, for instance, to irrigate vegetables as good quality irrigation water. In the case of using NF, however, the final product stream [42] can be used, for example: (1) as a low salinity water to irrigate cotton and grasses; and/or (2) for recycling through the process to depress the solubility limits of sodium sulfate; and/or (3) to produce sodium chloride salt by simple solar stills.

Figure 14:
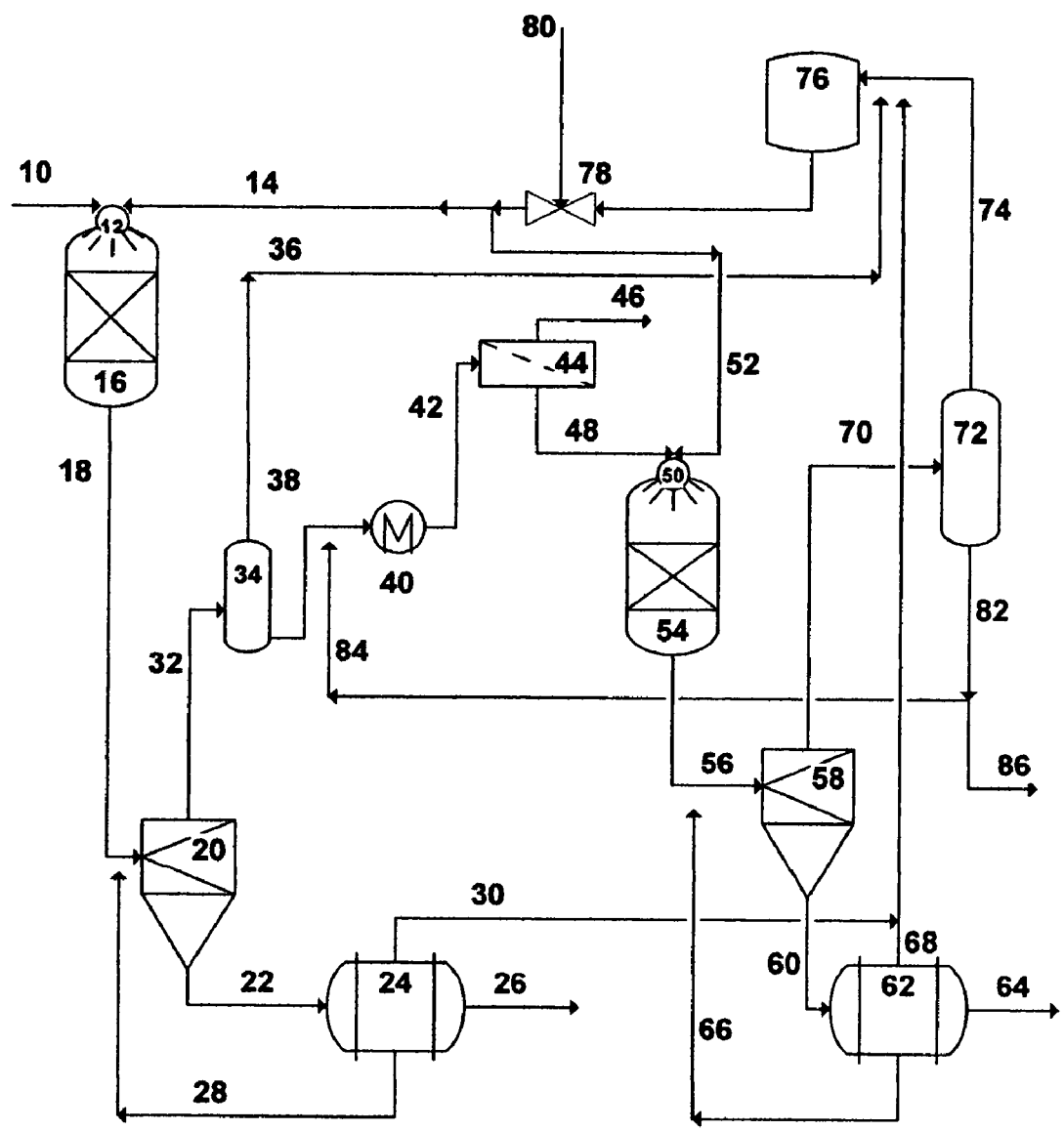
FIG. 14 illustrates a simplified flow sheet for the integration of NF or RO or MD with CPP.

Alternatively, the heat exchanger unit [40] as shown in FIG. 14 can be installed a head of the NF or RO unit [44]. The purpose for such an alternative is to fully utilize the inherited hydraulic energy within the NF or RO concentrate stream by avoiding pressure drops within the heat exchange unit before the precipitator unit (FIG. 13). However, implementing NF or RO at elevated temperatures would increase osmotic pressures across the membrane.

Table 1 indicates that the variations in osmotic pressures of the low salinity ADW (e.g., from Sumps) within the targeted temperature range (ambient to 343K) are almost insignificant. In addition, throughput across the NF or RO membrane is temperature dependent, and higher feed temperatures substantially enhance the diffusion water (reduce viscosity) through the membrane. Contrary to the operation of NF or RO at ambient temperatures, operating NF or RO for the treatment of low salinity ADW at elevated temperatures would: (1) increase the volume of the product stream (e.g., by about 3.5% per each 1° C.); and (2) reduce the required applied pressure (e.g., by about 3% per each 1° C.).

The inherited thermal energy within the NF or RO product stream [46] (FIG. 14) can also be recovered and reused through the process. If thermal energy is sufficiently available and at an acceptable cost (e.g., from SGSP), then conducting the NF or RO feed stream (FIG. 14) instead of the concentrate stream (FIG. 13) at elevated temperatures is economically feasible.

MD-CPP Processing System

MD refers to the transport of the vapor phase through pores of a hydrophobic membrane that separates two liquid solutions. The liquid solution cannot enter the membrane pores unless the applied pressure is greater than the specified "liquid entry" pressure for the porous partition of a given membrane. In the absence of such a pressure, vapor-liquid interfaces are formed on both sides of the membrane pores due to surface tension forces. Under these conditions, if a temperature difference is applied, a vapor pressure gradient will be created on both interfaces. Evaporation will take place at the warm membrane interface (feed), vapor will transport through the membrane pores with a convective and/or diffusion mechanism, and condensation will take place at the cold membrane interface (permeate). Thus, the net permeate vapor flux will be from the warm solution to the cold solution.

Several advantages of MD compared to pressure-driven or conventional thermal-driven desalination systems can be seen. First, MD can take place at low pressures that range from sub-atmospheric to 40 psi, which is contrary to NF and RO that ought to be operated at high pressures (e.g., about 900 psi) to exceed the natural osmotic pressure of ADW and to achieve the required throughput. Such high pressures require high power consumption. In addition, MD can be applied to aqueous streams with high osmotic pressures where NF or RO is practically inapplicable.

Second, MD can be conducted at temperatures that are appreciably lower than the boiling point of water (310-340K). Any form of low grade energy sources such as solar or wind or geothermal can be used. Hot and concentrated streams of ADW from solar ponds or basins can be treated by MD using their inherited thermal energy. A shell and tube heat exchange coupled with SGSP can also be used to operate MD for the treatment of ADW.

Third, the distillate product from ADW that contains non-volatile ions is an ultra-pure. Thus, entrainment of critical ions (such as the toxic selenium, boron, arsenic, etc.) in the product stream, as the case with NF or RO, is avoided. For instance, the removal of boron from ADW by NF or RO is very low. Boron removal is very critical to provide an acceptable quality of irrigation water.

Fourth, the evaporation surface of MD can be made similar to the available various pressure-driven membrane modules (hollow fiber and spiral wound). The modularity of MD allows the addition of processing capacity as needed, flexibility and simplicity are not easily available with conventional thermal-driven desalination processes.

As evaporation takes place in MD, however, the viscosity of ADW will increase with increasing ions concentrations. This could elevate osmotic pressures, depress vapor pressures, and alter heat and mass transfer across the boundary layers of the MD membrane. The osmotic pressure (psi) of a saline stream can be estimated from Eq. (2). The vapor pressure of a saline stream can be related to the osmotic pressure as follows:

$$p^s = \frac{p^o}{\exp\left[\frac{\Pi \tilde{v}_w}{RT}\right]} \quad (5)$$

where $p^s$ is the vapor pressure of a saline stream (mmHg), $p^o$ is the vapor pressure of pure water (mmHg) at a given temperature that can accurately be estimated by the Antoine equation, $\tilde{v}_w$ is the water molar volume (L/gmol) at a given temperature, R is the ideal gas constant (L psi/gmol K), and T is the temperature (K).

It is worth noting that the MD permeate flux is proportional to the vapor pressure difference between the MD feed and permeate streams. Since the relation between the vapor pressure and temperature is exponential, it is expected that the relation between the MD permeate flux and temperature is also exponential. As such, an increase or a decrease in the MD flux depends on the temperature range of the feed rather than the temperature difference between the feed and permeate streams.

Figure 15:
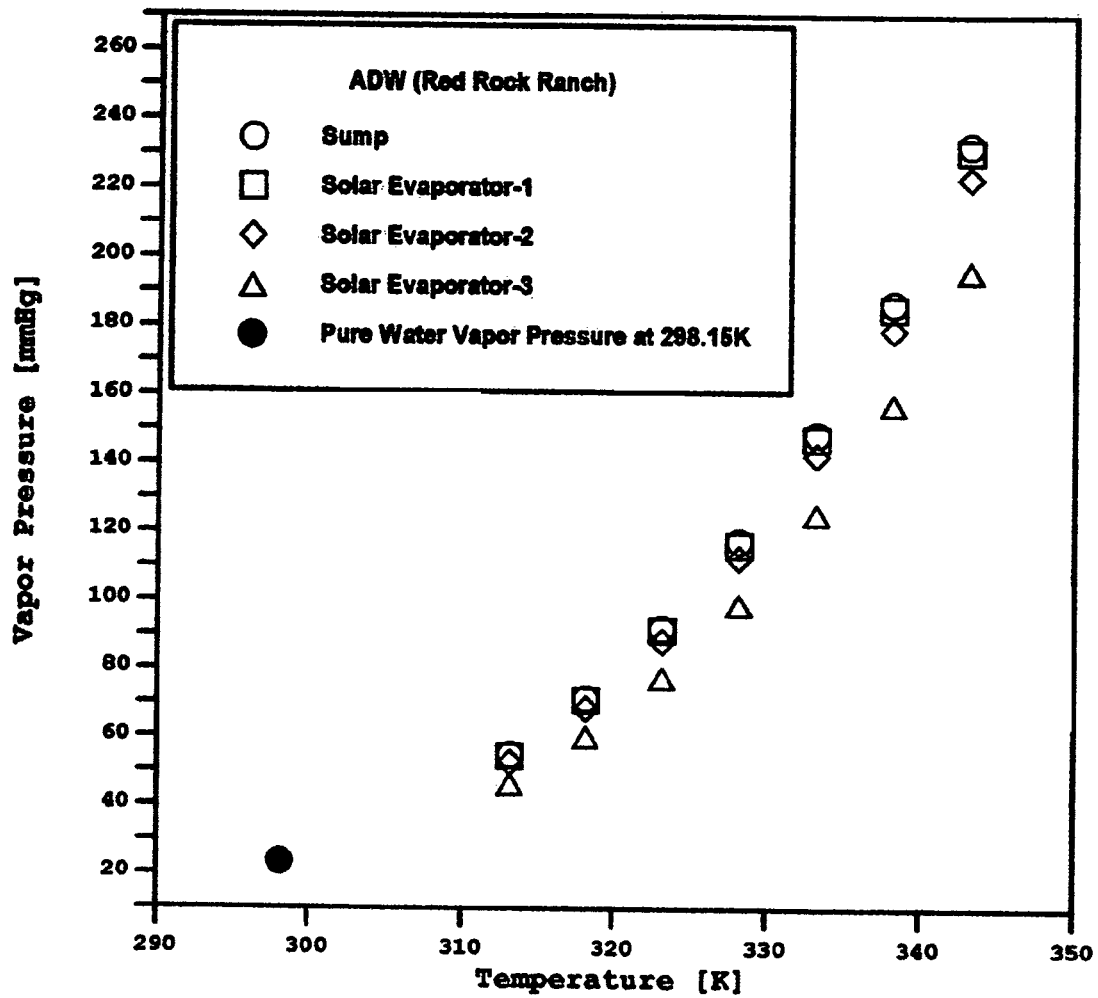
FIG. 15 illustrates vapor pressures of ADW streams at different salinity levels.

If potable water is used as the MD stripping (cold) stream at 298.2K, then the vapor pressure of pure water at 298.2K is the limit, in which the vapor pressure of MD feed stream (ADW) must exceed. FIG. 15 shows the vapor pressure of pure water at 298.2K along with the estimated vapor pressures of ADW by Eqs. (5) and (2) at different salinity levels and temperatures. FIG. 15 indicates that the MD permeate flux should not be affected by the presence of significant concentrations of sodium sulfate anhydrous and sodium chloride even at their saturation limits.

However, gypsum in ADW at all salinity levels (Table 1) is near saturation. Once the ADW stream is concentrated by MD and gypsum approaches its saturation limit, the viscosity of the concentrated ADW would increase and gypsum precipitates would possibly start nucleation at the membrane surface resulting in spontaneous wetting of the membrane. Increasing viscosity would also increase boundary layer thickness at the membrane surface. The overall resistance to heat and mass transfer at the membrane surface (temperature and concentration in the feed stream at the membrane surface could be different from their correspondent values in the bulk feed stream) would thus increase.

Gypsum and other minor sulfate scale must therefore be removed from ADW before applying MD. Since the solubility limits of sodium chloride within the MD temperatures range are lower than the solubility limits of sodium sulfate anhydrous, the targeted ADW stream should be concentrated by MD to a level below the saturation limits of sodium chloride. The MD concentrate stream will then be treated by CPP to separate sodium sulfate anhydrous from sodium chloride.

Figure 16A:
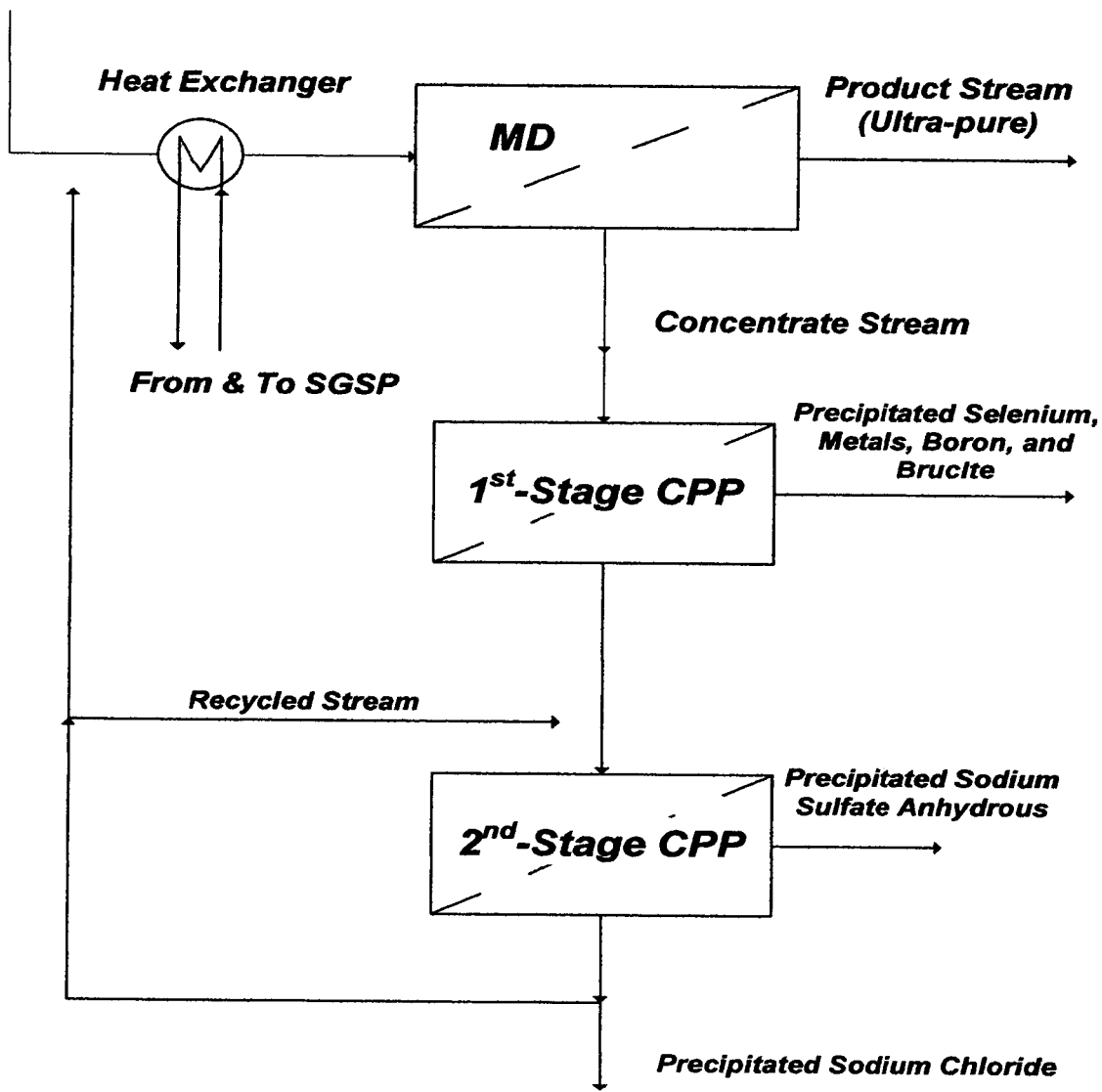
FIG. 16A illustrates the integration of MD with a dual-stage CPP post-treatment.

FIG. 16A shows a simplified flow sheet for the integration of MD with CPP. It is assumed that a preventive sulfate scale pretreatment is applied. CPP is used to treat the MD concentrate stream in a dual-stage post-treatment to remove impurities (selenium, metals, boron, and brucite), and then to separate sodium sulfate anhydrous from sodium chloride.

Figure 16B:
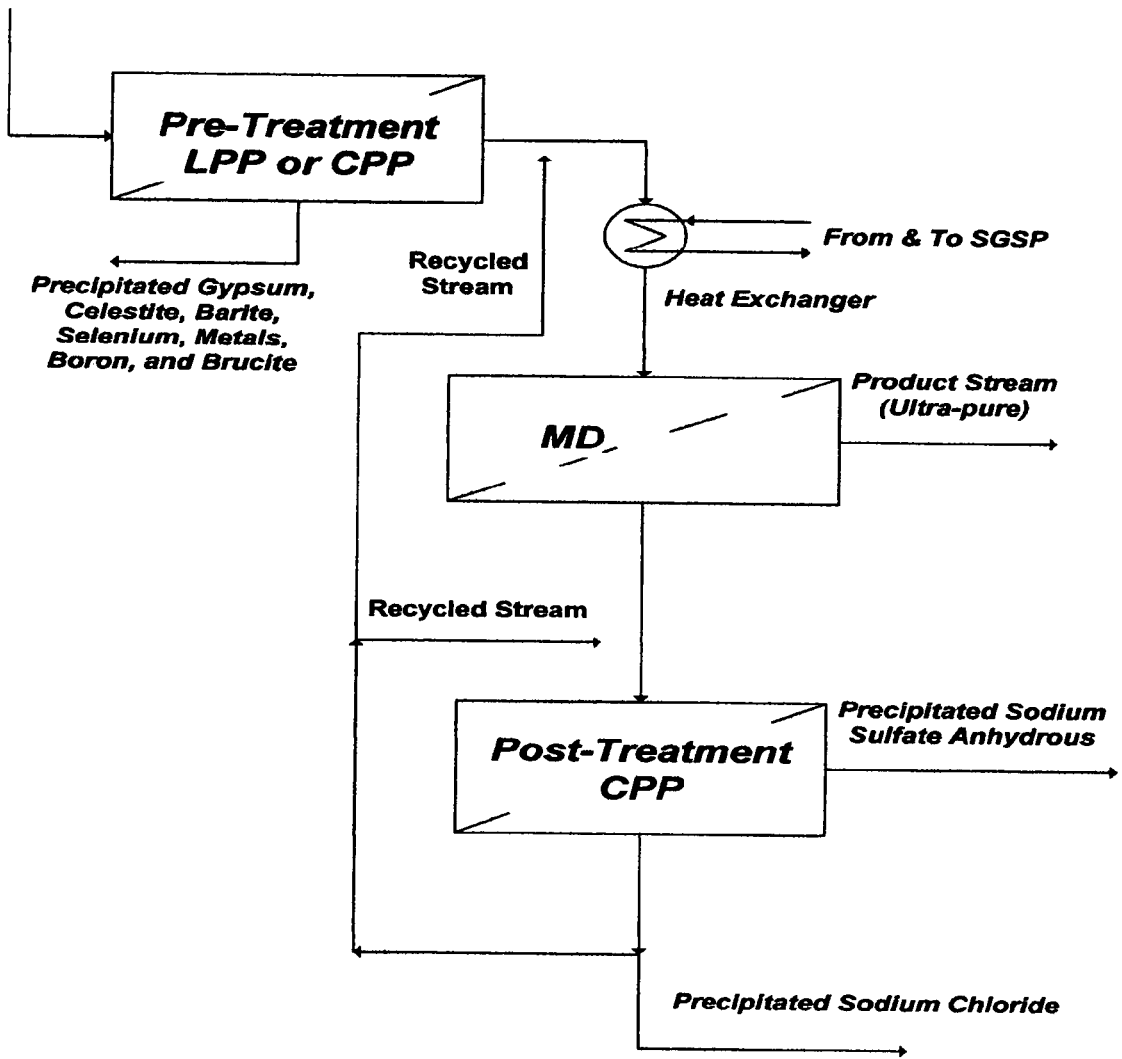
FIG. 16B illustrates the integration of MD with single-stage CPP as pre-treatment and post-treatment steps.

FIG. 16B shows a simplified flow sheet for the integrated MD-CPP processing system. It is assumed that a preventive sulfate scale pretreatment is not taken. CPP is implemented in a single-stage: (1) pre-treatment to remove sulfate scale and impurities from the MD feed stream; and (2) post-treatment for the MD concentrate stream to segregate sodium sulfate anhydrous from sodium chloride.

For the case that is depicted in FIG. 16A, the MD concentrate stream [10] will be fed into the first-stage precipitator unit [16] as shown in FIG. 10. The rest of the operational steps [12 to 74] are identical to the operational steps as described in the above section of the CPP processing system. For the case that is shown in FIG. 16B, the operational steps [10-86] as depicted in FIG. 14 and described in the above section of the NF-CPP or RO-CPP processing systems are applicable.

TABLE 1

Samples of ADW from Sumps and Solar Evaporators (Red Rock Ranch)

| Ions | Sump mg/L (m) | SE-1 mg/L (m) | SE-2 mg/L (m) | SE-3 mg/L (m) |
|---|---|---|---|---|
| Sodium | 2,880.00 (0.1243) | 8,790.00 (0.3712) | 30,200.00 (1.2299) | 125,000.00 (4.4677) |
| Potassium | 5.20 | 13.40 | 53.80 | 185.00 |
| Magnesium | 195.00 | 319.00 | 1,770.00 | 5,720.00 |
| Calcium | 606.00 (0.0150) | 536.00 (0.0130) | 707.00 (0.0165) | 428.00 (0.0088) |
| Strontium | <0.05 | NR | NR | NR |
| Barium | <0.50 | NR | NR | NR |
| Selenium | 1.05 | 2.28 | 8.84 | 25.00 |
| Manganese | <0.05 | <0.05 | <0.25 | <0.50 |
| Iron | <0.05 | 0.07 | 0.92 | <0.50 |
| Copper | 0.03 | 0.07 | 0.28 | 0.93 |
| Aluminum | <0.10 | NR | <0.50 | <1.00 |
| Boron | NR | 31.50 | 186.00 | 764.00 |
| Fluoride | <10.00 | NR | <100.00 | <200.00 |
| Chloride | 2,770.00 (0.0775) | 3,680.00 (0.1008) | 28,200.00 (0.7448) | 94,500.00 (2.1902) |
| Nitrate | 464.00 | 618.00 | 3,960.00 | 11,600.00 |
| Bicarbonate | 265.00 | 104.00 | 473.00 | 1,300.00 |
| Sulfate | 4,850.00 (0.0501) | 16,500.00 (0.1668) | 28,600.00 (0.2789) | 106,000.00 (0.9070) |
| Silica | 31.40 | NR | NR | NR |
| TDS (mg/L) | 11,510.00 | 29,680.00 | 87,600.00 | 298,200.00 |
| pH | 7.20 | NR | 8.20 | 8.50 |
| ρ (kg/L) | 1.01 | 1.03 | 1.07 | 1.22 |
| Π (298.15K) | 103.00 | 248.00 | 920.00 | 3,458.00 |
| Π (314.15K) | 108.00 | 261.00 | 966.00 | 3,632.00 |
| Π (333.15K) | 115.00 | 277.00 | 1,028.00 | 3,864.00 |
| Π (343.15K) | 118.00 | 286.00 | 1,059.00 | 3,980.00 |

SE: Solar Evaporators; m: molality (mol/kg); NR: Not Reported; Π: Osmotic Pressure (psi).

TABLE 2

Ions Concentrations in Natural Brine

| Ions | Concentration (mg/L) |
|---|---|
| Sodium | 141,972.0 |
| Potassium | 389.0 |
| Magnesium | 131.0 |
| Calcium | 10.0 |
| Iron | 0.9 |
| Copper | 0.6 |
| Arsenic | 0.4 |
| Boron | 100.0 |
| Chloride | 175,000.0 |
| Bicarbonate | 668.0 |
| Sulfate | 60,000.0 |

TABLE 3

Properties of Selected Pure Fluids

| Fluid | $T_b$ K | $T_C$ K | $p_C$ atm (psi) | $V_C$ mL/mol | ω | DP (debye) |
|---|---|---|---|---|---|---|
| $N_2$ | 77.4 | 126.2 | 33.4 (490.8) | 89.9 | 0.039 | 0.0 |
| $N_2O$ | 184.7 | 309.6 | 71.5 (1050.8) | 97.4 | 0.165 | 0.2 |
| MA ($CH_5N$) | 266.8 | 430.0 | 74.3 (1091.9) | | 0.292 | 1.3 |
| DMA ($C_2H_7N$) | 280.0 | 437.7 | 53.1 (780.4) | | 0.302 | 1.0 |
| EA ($C_2H_7N$) | 289.7 | 456.4 | 55.7 (818.6) | 182.0 | 0.289 | 1.3 |
| IPA ($C_3H_9N$) | 305.6 | 471.8 | 44.8 (658.4) | 221.0 | 0.291 | 1.2 |
| PA ($C_3H_9N$) | 321.7 | 497.0 | 48.1 (706.9) | 233.0 | 0.303 | 1.3 |
| DEA ($C_4H_{11}N$) | 328.6 | 496.5 | 37.1 (545.2) | 301.0 | 0.291 | 1.1 |
| DIPA ($C_6H_{15}N$) | 357.1 | 523.1 | 30.2 (443.8) | | 0.360 | 1.0 |
| DPA ($C_6H_{15}N$) | 382.5 | 555.8 | 29.9 (439.4) | | 0.471 | 1.0 |
| $H_2O$ | 373.2 | 647.3 | 218.3 (3208.1) | 57.1 | 0.344 | 1.8 |

$T_b$: Normal Boiling Point; $T_C$: Critical Temperature; $p_C$: Critical Pressure; $V_C$: Critical Volume; ω: Pitzer's Acentric Factor; DP: Dipole Moment

TABLE 4

Analysis of Sulfate and Chloride Species in NF.

| Ions | $C_F$ (mg/L) | $R_O$ (%) | $R_a$ (%) | $C_P$ (mg/L) | $C_m$ (mg/L) | $C_C$ (mg/L) |
|---|---|---|---|---|---|---|
| 33% Throughput Ratio | | | | | | |
| $Na^+$ | 4,980.0 | 77.5 | 79.8 | 1,120.0 | 5,537.8 | 6,881.2 |
| $K^+$ | 4.1 | 78.1 | 78.9 | 0.9 | 4.3 | 5.7 |
| $Mg^{+2}$ | 414.0 | 98.4 | 99.3 | 6.5 | 871.0 | 614.7 |
| $Ca^{+2}$ | 484.0 | 97.8 | 99.5 | 10.8 | 1,983.3 | 717.1 |
| $Sr^{+2}$ | 9.5 | 98.3 | 99.0 | 0.2 | 20.3 | 14.1 |
| *$Se^{+6}$ | 145.0 | 98.6 | 99.6 | 2.1 | 546.9 | 215.4 |
| *$Se^{+4}$ | 4.7 | 74.5 | 85.7 | 1.2 | 8.4 | 6.4 |
| $Cl^-$ | 1,070.0 | Neg. | | 1,530.0 | | |
| $NO_3^-$ | 19.0 | Neg. | | 35.0 | | |
| B | 44.0 | 9.1 | | 40.0 | | |
| $HCO_3^-$ | 283.0 | 30.0 | | 198.0 | | |
| $SO_4^{-2}$ | 11,800.0 | 98.4 | 99.4 | 194.0 | 32,438.0 | 17,516.0 |
| NaCl: | 1,764 | | | 2,522 | | |
| $Na_2SO_4 \cdot 10H_2O$: | | | | | 38,765 | 48,191 |
| $CaSO_4 \cdot 2H_2O$: | | | | | 8,516 | 3,079 |
| $SrSO_4$: | | | | | 43 | 30 |
| 65.8% Throughput Ratio | | | | | | |
| $Na^+$ | 7,730.0 | 83.7 | 88.7 | 1,260.0 | 11,170.0 | 20,178.0 |
| $K^+$ | 6.7 | 85.1 | 88.2 | 1.0 | 8.5 | 17.7 |
| $Mg^{+2}$ | 717.0 | 98.2 | 99.6 | 13.0 | 3,460.3 | 2,072.0 |
| $Ca^{+2}$ | 422.0 | 95.1 | 99.7 | 20.5 | 7,486.0 | 1,194.5 |
| $Sr^{+2}$ | 13.0 | 97.6 | 99.5 | 0.3 | 60.5 | 37.4 |
| *$Se^{+6}$ | 233.0 | 97.3 | 99.8 | 6.4 | 3,316.8 | 669.0 |
| *$Se^{+4}$ | 6.2 | 79.3 | 92.3 | 1.3 | 16.9 | 15.6 |
| $Cl^-$ | 711.0 | Neg. | | 1,530.0 | | |

TABLE 4-continued

Analysis of Sulfate and Chloride Species in NF.

| Ions | $C_F$ (mg/L) | $R_O$ (%) | $R_a$ (%) | $C_P$ (mg/L) | $C_m$ (mg/L) | $C_C$ (mg/L) |
|---|---|---|---|---|---|---|
| $NO_3^-$ | 11.0 | Neg. | | 29.0 | | |
| B | 45.0 | 6.7 | | 42.0 | | |
| $HCO_3^-$ | 309.0 | 0.3 | | 308.0 | | |
| $SO_4^{-2}$ | 18,900.0 | 97.7 | 99.7 | 440.0 | 146,257.0 | 54,417.0 |
| NaCl: | 1,172 | | | 2,522 | | |
| $Na_2SO_4 \cdot 10H_2O$: | | | | | 78,225 | 141,309 |
| $CaSO_4 \cdot 2H_2O$: | | | | | 32,147 | 5,129 |
| $SrSO_4$: | | | | | 127 | 78 |
| | | | 76.6% Throughput Ratio | | | |
| $Na^+$ | 10,400.0 | 87.2 | 90.1 | 1,330.0 | 13,508.0 | 40,091.0 |
| $K^+$ | 8.9 | 88.8 | 89.6 | 1.0 | 9.7 | 34.8 |
| $Mg^{+2}$ | 998.0 | 98.2 | 99.7 | 18.0 | 5,575.0 | 4,206.0 |
| $Ca^{+2}$ | 434.0 | 94.0 | 99.8 | 26.2 | 11,134.0 | 1,769.0 |
| $Sr^{+2}$ | 16.0 | 97.4 | 99.6 | 0.4 | 93.8 | 67.1 |
| *$Se^{+6}$ | 308.0 | 96.4 | 99.8 | 11.0 | 6,634.7 | 1,280.0 |
| *$Se^{+4}$ | 7.4 | 71.6 | 93.3 | 2.1 | 31.4 | 24.8 |
| $Cl^-$ | 419.0 | Neg. | | 1,390.0 | | |
| $NO_3^-$ | 6.1 | Neg. | | 23.0 | | |
| B | 47.0 | 4.3 | | 45.0 | | |
| $HCO_3^-$ | 281.0 | Neg. | | 412.0 | | |
| $SO_4^{-2}$ | 26,100.0 | 97.3 | 99.7 | 703.0 | 271,918.0 | 109,237.0 |
| NaCl: | 691 | | | 2,291 | | |
| $Na_2SO_4 \cdot 10H_2O$: | | | | | 94,494 | 280,760 |
| $CaSO_4 \cdot 2H_2O$: | | | | | 47,809 | 7,595 |
| $SrSO_4$: | | | | | 197 | 141 |

$R_a$: Actual Rejection; $R_O$: Observed Rejection; $C_F$: Feed Stream Concentration; $C_P$: Product Stream Concentration; $C_m$: Concentration at the Membrane Surface; $C_C$: Concentrate Stream Concentration;
*Selenium Species in μg/L;
Neg.: Negative Rejection;

TABLE 5

Analysis of Osmotic Pressure Differences Across the NF Membrane

| TR (%) | $\Pi_P$ (psi) | $\Pi_m/\Pi_m^*$ (psi) | $\Delta\Pi/\Delta\Pi^*$ (psi) |
|---|---|---|---|
| 33.0 | 14.7 | 217.5/140.9 | 202.8/126.2 |
| 65.8 | 19.2 | 808.9/355.5 | 789.7/336.3 |
| 76.6 | 21.6 | 1,368.1/471.5 | 1,346.5/449.9 |

TR: Throughput Ratio; $\Pi_P$: Osmotic Pressure of the Product Stream; $\Pi_m$: Osmotic Pressure at the Membrane surface; $\Pi_m^*$: Corrected Osmotic Pressure at the Membrane Surface; $\Delta\Pi = \Pi_m - \Pi_P$; and $\Delta\Pi^* = \Pi_m^* - \Pi_P$.

What is claimed is:

1. A method for producing sodium sulfate and sodium chloride from saline water, said method comprising the steps of:
   (a) removing sulfate scale and impurities from said saline water by
      (i) injecting said saline water into a first precipitator at a pressure between 200 psi and 1,000 psi through at least one nozzle to produce a jet stream from said saline water;
      (ii) injecting amine solvent or amine solvent with modifier into said first precipitator at a pressure between 200 psi and the critical pressure of said amine solvent or said amine solvent with modifier through at least one nozzle to form precipitates comprising said sulfate scale and said impurities from said saline water;
      (iii) filtering said saline water to remove said precipitates in the under-flow of a first filter and to produce intermediate saline water in the over-flow of said first filter;
      (iv) removing at least most of said amine solvent or said amine solvent with modifier from said under-flow of said first filter by a first stripping unit;
   (b) removing sodium sulfate from said intermediate saline water by
      (i) injecting said intermediate saline water into a second precipitator at a pressure between 200 psi and 1,000 psi through at least one nozzle to produce a jet stream of said intermediate saline water;
      (ii) injecting said amine solvent or said amine solvent with modifier into said second precipitator at a pressure between 200 psi and the critical pressure of said amine solvent or said amine solvent with modifier through at least one nozzle to form precipitates comprising said sodium sulfate from said intermediate saline water;
      (iii) filtering said intermediate saline water to remove said precipitates in the under-flow of a second filter and to produce sodium chloride rich water in the over-flow of said second filter;
      (iv) removing at least most of said amine solvent or said amine solvent with modifier from said under-flow of said second filter by a second stripping unit;
      (v) removing at least most of said amine solvent or said amine solvent with modifier from said over-flow of said second filter by a third stripping unit;
   (c) recycling said sodium chloride rich water through said method to depress the solubility limits of said sodium sulfate; or
   (d) using said sodium chloride rich water to irrigate salt tolerant crops; or
   (e) blending said sodium chloride rich water with irrigation water to irrigate low salt tolerant crops; or (f) using said sodium chloride rich water to construct salt gradient solar ponds to produce energy; or (g) evaporating said sodium chloride rich water in solar stills to produce sodium chloride.

2. A method for producing sodium sulfate and sodium chloride from saline water, said method comprising the steps of:
- (a) removing sulfate from said saline water by nanofiltration to produce sulfate rich concentrate and sodium chloride rich water;
- (b) removing sulfate scale and impurities from said sulfate rich concentrate by
  - (i) injecting said sulfate rich concentrate into a first precipitator at a pressure between 200 psi and 1,000 psi through at least one nozzle to produce a jet stream from said sulfate rich concentrate;
  - (ii) injecting amine solvent or amine solvent with modifier into said first precipitator at a pressure between 200 psi and the critical pressure of said amine solvent or said amine solvent with modifier through at least one nozzle to form precipitates comprising said sulfate scale and said impurities from said sulfate rich concentrate;
  - (iii) filtering said sulfate rich concentrate to remove said precipitates in the under-flow of a first filter and to produce sodium sulfate rich water in the over-flow of said first filter;
  - (iv) removing at least most of said amine solvent or said amine solvent with modifier from said under-flow of said first filter by a first stripping unit;
- (c) removing sodium sulfate from said sodium sulfate rich water by
  - (i) injecting said sodium sulfate rich water into a second precipitator at a pressure between 200 psi and 1,000 psi through at least one nozzle to produce a jet stream of said sodium sulfate rich water;
  - (ii) injecting said amine solvent or said amine solvent with modifier into said second precipitator at a pressure between 200 psi and the critical pressure of said amine solvent or said amine solvent with modifier through at least one nozzle to form precipitates comprising said sodium sulfate from said sodium sulfate rich water;
  - (iii) filtering said sodium sulfate rich water to remove said precipitates in the under-flow of a second filter and to produce intermediate sodium sulfate rich water in the over-flow of said second filter;
  - (iv) removing at least most of said amine solvent or said amine solvent with modifier from said under-flow of said second filter by a second stripping unit;
  - (v) removing at least most of said amine solvent or said amine solvent with modifier from said over-flow of said second filter by a third stripping unit;
  - (vi) recycling said intermediate sodium sulfate rich water through said method; or
  - (vii) using some of said intermediate sodium sulfate rich water to construct salt gradient solar ponds to produce energy;
- (d) recycling said sodium chloride rich water through said method to depress the solubility limits of said sodium sulfate; or
- (e) using said sodium chloride rich water to irrigate salt tolerant crops; or
- (f) blending said sodium chloride rich water with irrigation water to irrigate low salt tolerant crops; or
- (g) using said sodium chloride rich water to construct salt gradient solar ponds to produce energy; or
- (h) evaporating said sodium chloride rich water in solar stills to produce sodium chloride.

3. A method for producing sodium sulfate and sodium chloride from saline water, said method comprising the steps of:
- (a) removing sulfate scale and impurities from said saline water by
  - (i) injecting said saline water into a first precipitator at a pressure between 200 psi and 1,000 psi through at least one nozzle to produce a jet stream from said saline water;
  - (ii) injecting amine solvent or amine solvent with modifier into said first precipitator at a pressure between 200 psi and the critical pressure of said amine solvent or said amine solvent with modifier through at least one nozzle to form precipitates comprising said sulfate scale and said impurities from said saline water;
  - (iii) filtering said saline water to remove said precipitates in the under-flow of a first filter and to produce intermediate saline water in the over-flow of said first filter;
  - (iv) removing at least most of said amine solvent or said amine solvent with modifier from said under-flow of said first filter by a first stripping unit;
  - (v) removing at least most of said amine solvent or said amine solvent with modifier from said over-flow of said first filter by a second stripping unit;
- (b) removing sulfate from said intermediate saline water by nanofiltration to produce sodium sulfate rich concentrate and sodium chloride rich water;
- (c) removing sodium sulfate from said sodium sulfate rich concentrate by
  - (i) injecting said sodium sulfate rich concentrate into a second precipitator at a pressure between 200 psi and 1,000 psi through at least one nozzle to produce a jet stream of said sodium sulfate rich concentrate;
  - (ii) injecting said amine solvent or said amine solvent with modifier into said second precipitator at a pressure between 200 psi and the critical pressure of said amine solvent or said amine solvent with modifier through at least one nozzle to form precipitates comprising said sodium sulfate from said sodium sulfate rich concentrate;
  - (iii) filtering said sodium sulfate rich concentrate to remove said precipitates in the under-flow of a second filter and to produce intermediate sodium sulfate rich water in the over-flow of said second filter;
  - (iv) removing at least most of said amine solvent or said amine solvent with modifier from said under-flow of said second filter by a third stripping unit;
  - (v) removing at least most of said amine solvent or said amine solvent with modifier from said over-flow of said second filter by a fourth stripping unit;
  - (vi) recycling said intermediate sodium sulfate rich water through said method; or
  - (vii) using some of said intermediate sodium sulfate rich water to construct salt gradient solar ponds to produce energy;
- (d) recycling said sodium chloride rich water through said method to depress the solubility limits of said sodium sulfate; or
- (e) using said sodium chloride rich water to irrigate salt tolerant crops; or
- (f) blending said sodium chloride rich water with irrigation water to irrigate low salt tolerant crops; or
- (g) using said sodium chloride rich water to construct salt gradient solar ponds to produce energy; or (h) evaporating said sodium chloride rich water in solar stills to produce sodium chloride.

4. A method for producing sodium sulfate, sodium chloride, and potable water from saline water, said method comprising the steps of:
   (a) producing potable water and concentrate from said saline water by reverse osmosis or membrane distillation;
   (b) removing sulfate scale and impurities from said concentrate by
      (i) injecting said concentrate into a first precipitator at a pressure between 200 psi and 1,000 psi through at least one nozzle to produce a jet stream from said concentrate;
      (ii) injecting amine solvent or amine solvent with modifier into said first precipitator at a pressure between 200 psi and the critical pressure of said amine solvent or said amine solvent with modifier through at least one nozzle to form precipitates comprising said sulfate scale and said impurities from said concentrate;
      (iii) filtering said concentrate to remove said precipitates in the under-flow of a first filter and to produce intermediate concentrate in the over-flow of said first filter;
      (iv) removing at least most of said amine solvent or said amine solvent with modifier from said under-flow of said first filter by a first stripping unit;
   (c) removing sodium sulfate from said intermediate concentrate by
      (i) injecting said intermediate concentrate into a second precipitator at a pressure between 200 psi and 1,000 psi through at least one nozzle to produce a jet stream of said intermediate concentrate;
      (ii) injecting said amine solvent or said amine solvent with modifier into said second precipitator at a pressure between 200 psi and the critical pressure of said amine solvent or said amine solvent with modifier through at least one nozzle to form precipitates comprising said sodium sulfate from said intermediate concentrate;
      (iii) filtering said intermediate concentrate to remove said precipitates in the under-flow of a second filter and to produce sodium chloride rich water in the over-flow of said second filter;
      (iv) removing at least most of said amine solvent or said amine solvent with modifier from said under-flow of said second filter by a second stripping unit;
      (v) removing at least most of said amine solvent or said amine solvent with modifier from said over-flow of said second filter by a third stripping unit;
   (d) recycling said sodium chloride rich water through said method to depress the solubility limits of said sodium sulfate; or
   (e) using said sodium chloride rich water to irrigate salt tolerant crops; or
   (f) blending said sodium chloride rich water with irrigation water to irrigate low salt tolerant crops; or
   (g) using said sodium chloride rich water to construct salt gradient solar ponds to produce energy; or
   (h) evaporating said sodium chloride rich water in solar stills to produce sodium chloride.

5. A method for producing sodium sulfate, sodium chloride, and potable water from saline water, said method comprising the steps of:
   (a) removing sulfate scale and impurities from said saline water by
      (i) injecting said saline water into a first precipitator at a pressure between 200 psi and 1,000 psi through at least one nozzle to produce a jet stream from said saline water;
      (ii) injecting amine solvent or amine solvent with modifier into said first precipitator at a pressure between 200 psi and the critical pressure of said amine solvent or said amine solvent with modifier through at least one nozzle to form precipitates comprising said sulfate scale and said impurities from said saline water;
      (iii) filtering said saline water to remove said precipitates in the under-flow of a first filter and to produce intermediate saline water in the over-flow of said first filter;
      (iv) removing at least most of said amine solvent or said amine solvent with modifier from said under-flow of said first filter by a first stripping unit;
      (v) removing at least most of said amine solvent or said amine solvent with modifier from said over-flow of said first filter by a second stripping unit;
   (b) producing potable water and concentrate from said intermediate saline water by reverse osmosis or membrane distillation;
   (c) removing sodium sulfate from said concentrate by
      (i) injecting said concentrate into a second precipitator at a pressure between 200 psi and 1,000 psi through at least one nozzle to produce a jet stream of said concentrate;
      (ii) injecting said amine solvent or said amine solvent with modifier into said second precipitator at a pressure between 200 psi and the critical pressure of said amine solvent or said amine solvent with modifier through at least one nozzle to form precipitates comprising said sodium sulfate from said concentrate;
      (iii) filtering said concentrate to remove said precipitates in the under-flow of a second filter and to produce sodium chloride rich water in the over-flow of said second filter;
      (iv) removing at least most of said amine solvent or said amine solvent with modifier from said under-flow of said second filter by a third stripping unit;
      (v) removing at least most of said amine solvent or said amine solvent with modifier from said over-flow of said second filter by a fourth stripping unit;
   (d) recycling said sodium chloride rich water through said method to depress the solubility limits of said sodium sulfate; or
   (e) using said sodium chloride rich water to irrigate salt tolerant crops; or
   (f) blending said sodium chloride rich water with irrigation water to irrigate low salt tolerant crops; or
   (g) using said sodium chloride rich water to construct salt gradient solar ponds to produce energy; or
   (h) evaporating said sodium chloride rich water in solar stills to produce sodium chloride.

6. The method of claim 1 or 2 or 3 or 4 or 5 wherein said saline water is agricultural drainage water, natural brine, pulp and paper processed water, textile processed water, water of hydration from melted Glauber's salts, blow-down water from conventional thermal driven desalination systems, oil-gas fields produced water, coal-bed produced water, mining operations produced water, flue gas desulphurization produced water, or a combination thereof.

7. The method of claim 1 or 2 or 3 or 4 or 5 wherein said sulfate scale is calcium sulfate, strontium sulfate, barium sulfate, or a combination thereof.

8. The method of claim 1 or 2 or 3 or 4 or 5 wherein said impurities are selenium, boron, copper, iron, manganese, arsenic, aluminum, cobalt, nickel, zinc, magnesium, or a combination thereof.

9. The method of claim 1 or 2 or 3 or 4 or 5 wherein said nozzle is coaxial nozzle, spray nozzle, vibrating nozzle, pre-mixed nozzle, or a combination thereof.

10. The method of claim 1 or 2 or 3 or 4 or 5 wherein said amine solvent is selected from the group consisting of isopropylamine, propylamine, dipropylamine, diisopropylamine, ethylamine, diethylamine, methylamine, dimethylamine, or a combination thereof.

11. The method of claim 1 or 2 or 3 or 4 or 5 wherein said modifier is nitrogen, nitrous oxide, or a combination thereof.

12. The method of claim 1 or 2 or 3 or 4 or 5 wherein said filter is a hydrocyclone, microfiltration, ultrafiltration, vacuum filter, press filter, centrifugal filter, electrostatic filter, or a combination thereof.

13. The method of claim 1 or 2 or 3 or 4 or 5 wherein said stripping unit is a flash tank, distillation column, vacuum distillation, vacuum membrane distillation, vacuum filter, pervaporation, or a combination thereof.

14. The method of claim 1 or 2 or 3 or 4 or 5 wherein said sodium sulfate is anhydrous or decahydrate or a combination thereof.

* * * * *